(12) United States Patent
Fernandes et al.

(10) Patent No.: US 8,240,557 B2
(45) Date of Patent: *Aug. 14, 2012

(54) COLLABORATIVE NEGOTIATION TECHNIQUES FOR MOBILE PERSONAL TRUSTED DEVICE FINANCIAL TRANSACTIONS

(75) Inventors: Jorge M. Fernandes, Los Altos Hills, CA (US); Mohammad A. Khan, San Jose, CA (US); Kerry Brown, Portola Valley, CA (US)

(73) Assignee: Vivotech, Inc., Santa Clara, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 12/287,283

(22) Filed: Oct. 7, 2008

(65) Prior Publication Data

US 2009/0108064 A1   Apr. 30, 2009

Related U.S. Application Data

(63) Continuation of application No. 11/137,682, filed on May 24, 2005, now Pat. No. 7,494,055, which is a continuation-in-part of application No. 10/428,502, filed on May 2, 2003.

(60) Provisional application No. 60/411,536, filed on Sep. 17, 2002.

(51) Int. Cl.
*G06K 5/00* (2006.01)
(52) U.S. Cl. .................. 235/380; 235/379; 235/383
(58) Field of Classification Search .................. 235/380, 235/379, 383; 705/41, 64
See application file for complete search history.

(56) References Cited

U.S. PATENT DOCUMENTS

| 4,120,011 A | 10/1978 | Kolb, Jr. |
| 4,575,621 A | 3/1986 | Dreifus |
| 4,701,601 A | 10/1987 | Francini et al. |

(Continued)

FOREIGN PATENT DOCUMENTS

EP   0863477 A1   9/1998

(Continued)

OTHER PUBLICATIONS

AS. Petri, "An Introduction to Smart Cards," Litronic, Inc. Messaging Magazine, 1999, pp. 1-12.

(Continued)

*Primary Examiner* — Ahshik Kim
(74) *Attorney, Agent, or Firm* — Jenkins, Wilson, Taylor & Hunt, P.A.

(57) ABSTRACT

Techniques for negotiation techniques for mobile personal trusted device financial transactions are provided. A user of a mobile personal trusted device sets user preferences that define the user's preferred parameters for conducting financial transactions. A merchant sets merchant preferences that define the merchant's preferred parameters for conducting financial transactions. When a financial transaction is initiated, a user preference and a merchant preferences are accessed. A negotiated preference is generated that accommodates both the user preference and the merchant preference. If the user preference and the merchant preference are not mutually exclusive, the negotiated preference attempts to satisfy both preferences. If the user preference and the merchant preference are mutually exclusive, the negotiated preference satisfies at least one of the two preferences based on which of the two preferences has a higher priority. The financial transaction is conducted based on the negotiated preference.

22 Claims, 22 Drawing Sheets

U.S. PATENT DOCUMENTS

| | | | |
|---|---|---|---|
| 4,758,714 | A | 7/1988 | Carlson et al. |
| 4,788,420 | A | 11/1988 | Chang et al. |
| 4,973,828 | A | 11/1990 | Naruse et al. |
| 5,157,247 | A | 10/1992 | Takahira |
| 5,266,789 | A | 11/1993 | Anglin et al. |
| 5,276,311 | A | 1/1994 | Hennige |
| 5,530,232 | A | 6/1996 | Taylor |
| 5,590,038 | A | 12/1996 | Pitroda |
| 5,594,233 | A | 1/1997 | Kenneth et al. |
| 5,602,377 | A | 2/1997 | Beller et al. |
| 5,608,193 | A | 3/1997 | Almogaibil |
| 5,679,945 | A | 10/1997 | Renner et al. |
| 5,781,723 | A | 7/1998 | Yee et al. |
| 5,796,828 | A | 8/1998 | Tsukamoto et al. |
| 5,797,470 | A | 8/1998 | Bohnert et al. |
| 5,797,740 | A | 8/1998 | Bohnert et al. |
| 5,850,077 | A | 12/1998 | Tognazzini |
| 5,859,419 | A | 1/1999 | Wynn |
| 5,878,141 | A | 3/1999 | Daly et al. |
| 5,917,168 | A | 6/1999 | Nakamura et al. |
| 5,955,961 | A | 9/1999 | Wallerstein |
| 5,991,410 | A | 11/1999 | Albert et al. |
| 6,018,717 | A | 1/2000 | Lee et al. |
| 6,038,491 | A | 3/2000 | McGarry et al. |
| 6,061,665 | A | 5/2000 | Bahreman |
| 6,068,183 | A | 5/2000 | Freeman et al. |
| 6,131,811 | A | 10/2000 | Gangi |
| 6,141,161 | A | 10/2000 | Sato et al. |
| 6,155,484 | A | 12/2000 | Sasaki |
| 6,175,922 | B1 | 1/2001 | Wang |
| 6,181,981 | B1 | 1/2001 | Varga et al. |
| 6,189,791 | B1 | 2/2001 | Takita et al. |
| 6,206,293 | B1 | 3/2001 | Gutman et al. |
| 6,233,448 | B1 | 5/2001 | Alperovich et al. |
| 6,250,557 | B1 * | 6/2001 | Forslund et al. ............... 235/492 |
| 6,293,462 | B1 | 9/2001 | Gangi |
| 6,295,482 | B1 | 9/2001 | Tognazzini |
| 6,446,864 | B1 | 9/2002 | Kim et al. |
| 6,584,309 | B1 | 6/2003 | Whigham |
| 6,637,653 | B1 | 10/2003 | Takita et al. |
| 6,658,248 | B1 | 12/2003 | Lee |
| 6,662,224 | B1 | 12/2003 | Angwin et al. |
| 6,704,567 | B1 | 3/2004 | Chapman, Jr. et al. |
| 6,711,263 | B1 | 3/2004 | Nordenstam et al. |
| 6,769,607 | B1 | 8/2004 | Pitroda et al. |
| 6,844,813 | B2 | 1/2005 | Hardman |
| 7,028,897 | B2 | 4/2006 | Fernandes et al. |
| 7,051,932 | B2 | 5/2006 | Fernandes et al. |
| 7,127,236 | B2 | 10/2006 | Khan et al. |
| 7,494,055 | B2 | 2/2009 | Fernandes et al. |
| 7,775,442 | B2 | 8/2010 | Saarisalo |
| 2001/0034566 | A1 | 10/2001 | Offer |
| 2002/0062249 | A1 | 5/2002 | Iannacci |
| 2002/0128981 | A1 | 9/2002 | Kawan et al. |
| 2003/0055735 | A1 | 3/2003 | Cameron et al. |
| 2003/0169180 | A1 | 9/2003 | Hardman |
| 2003/0172028 | A1 | 9/2003 | Abell et al. |
| 2003/0229583 | A1 | 12/2003 | Cotton et al. |
| 2004/0159700 | A1 | 8/2004 | Khan et al. |
| 2004/0181453 | A1 | 9/2004 | Ray et al. |
| 2005/0035192 | A1 | 2/2005 | Bonalle et al. |
| 2005/0059339 | A1 | 3/2005 | Honda et al. |
| 2005/0060062 | A1 | 3/2005 | Walker et al. |
| 2005/0128981 | A1 | 6/2005 | Creamer et al. |
| 2005/0192896 | A1 | 9/2005 | Hutchinson et al. |
| 2006/0002610 | A1 | 1/2006 | Suomela et al. |
| 2007/0192245 | A1 | 8/2007 | Fisher |
| 2011/0244796 | A1 | 10/2011 | Khan et al. |

FOREIGN PATENT DOCUMENTS

| | | |
|---|---|---|
| EP | 949593 A2 * | 10/1999 |
| EP | 1104909 A2 | 6/2001 |
| KR | 10-2007-00737 18 | 7/2007 |
| KR | 10-2009-00293 23 | 3/2009 |
| WO | WO 0137199 A1 | 5/2001 |
| WO | WO 0137200 A1 | 5/2001 |
| WO | WO 03/058947 A2 | 7/2003 |
| WO | WO 2011/127084 A2 | 10/2011 |

OTHER PUBLICATIONS

Non-Final Official Action for U.S. Appl. No. 13/080,613 (Apr. 5, 2012).

Final Official Action for U.S. Appl. No. 10/428,502 (Feb. 8, 2012).

Commonly-assigned, co-pending U.S. Appl. No. 13/283,521 for "Systems, Methods, and Computer Readable Media for Using One or More Preferred Application Lists in a Wireless Device Reader," (Unpublished, filed Oct. 27, 2011).

Notification of Transmittal of the International Search Report and the Written Opinion of the International Searching Authority, or the Declaration for International Applicaton No. PCT/US2011/031293 (Oct. 24, 2011).

Decision on Appeal for U.S. Appl. No. 10/428,502 (Feb. 23, 2010).

Reply Brief Noted for U.S. Appl. No. 10/428,502 (Dec. 3, 2008).

Examiner's Answer for U.S. Appl. No. 10/428,502 (Aug. 25, 2008).

Notice of Allowance and Fee(s) Due for U.S. Appl. No. 11/137,682 (Jun. 30, 2008).

"Part III: Files, Commands, and Application Selection," EMV Integrated Circuit Card Specifications for Payment Systems, Book 1: Application Independent ICC to Terminal Interface Requirements, Version 4.2, pp. 119-150 (Jun. 2008).

"10, Data Management," EMV Circuit Card Specifications for Payment Systems, Book 4: Cardholder, Attendant, and Acquirer Interface Requirements, Version 4.2, pp. 81-94 (Jun. 2008).

Notice of Panel Decision from Pre-Appeal Brief Review for U.S. Appl. No. 10/428,502 (May 14, 2008).

Final Official Action for U.S. Appl. No. 11/137,682 (Dec. 13, 2007).

Final Official Action for U.S. Appl. No. 10/428,502 (Nov. 28, 2007).

Non-Final Official Action for U.S. Appl. No. 10/428,502 (Apr. 16, 2007).

Non-Final Official Action for U.S. Appl. No. 11/137,682 (Mar. 20, 2007).

Final Official Action for U.S. Appl. No. 10/428,502 (Aug. 15, 2006).

Non-Final Official Action for U.S. Appl. No. 10/428,502 (Dec. 22, 2005).

"Identification cards—Integrated circuit cards—Part 4: Organization, security and commands for interchange,"ISO/IEC 7816-4, Second Edition, pp. 1-90 (Jan, 15, 2005).

"Information technology—Telecommunications and information exchange between systems—Near Field Communications—Interface and Protocol (NFCIP-1)," ISO/IEC 18092, pp. 1-66 (Apr. 1, 2004).

Identification cards—Contactless integrated circuit(s) cards—Proximity cards—Part 2: Radio frequency power and signal interface,∞ ISO/IEC 14443-2, pp. 1-10 (Jul. 22, 2003).

Commonly-assigned, co-pending U.S. Appl. No. 10/428,502 for "Collaborative Negotiation Techniques for Mobile Personal Trusted Device Financial Transactions," (Unpublished, filed May 2, 2003).

"Information technology—Identification cards—Integrated circuit(s) cards with contacts—Part 5: Registration of application providers," ISO/IEC 7816-5.2, pp. 1-12 (Jan. 17, 2003).

"Information technology—Identification cards—Integrated circuit(s) cards with contacts—Part 4: Interindustry commands for interchange," ISO/IEC 7816-4, pp. 1-85 (Jan. 17, 2003).

"Identification cards—Contactless integrated circuit(s) cards—Vicinity cards—Part 3: Anticollision and transmission protocol," ISO/IEC 15693-3, First Editon, pp. 1-50 (Apr. 1, 2001).

"Identification cards—Recording technique—Part 2: Magnetic stripe—Low coercivity," ISO/IEC 7811-2, Third Edition, pp. 1-28 (Feb. 1, 2001).

"Identification cards—Contactless integrated circuit(s)—Vicinity cards—Part 1: Physical Characterstics," ISO/IEC 15693-1, First Edition, pp. 1-12 (Jul. 15, 2000).

"Identification cards—Contactless integrated circuit(s) cards—Vicinity cards—Part 2: Air interface and initialization," ISO/IEC 15693-2, First Edition, pp. 1-19 (May 1, 2000).

"Identification cards—Contactless integrated circuit(s) cards—Proximity cards—Part 4: Transmission protocol," ISO/IEC 14443-4, pp. 1-39 (Mar. 10, 2000).

"Identification cards—Contactless integrated circuit(s) cards—Proximity cards—Part 3: Initialization and anticollision," ISO/IEC 14443-3, pp. 1-48 (Jun. 11, 1999).

"Indentification cards—Contactless integrated circuit(s) cards with contacts—Part 5: Numbering system and registration procedure for application indentifiers," ISO/IEC 7816-5, Amendment 1, pp. 1-8 (Dec. 15, 1996).

"Identification cards—Integrated circuit(s) cards with contacts—Part 5: Numbering system and registration procedure for application identifiers," ISO/IEC 7816-5, First Edition, pp. 1-12 (Jun. 15, 1994).

* cited by examiner

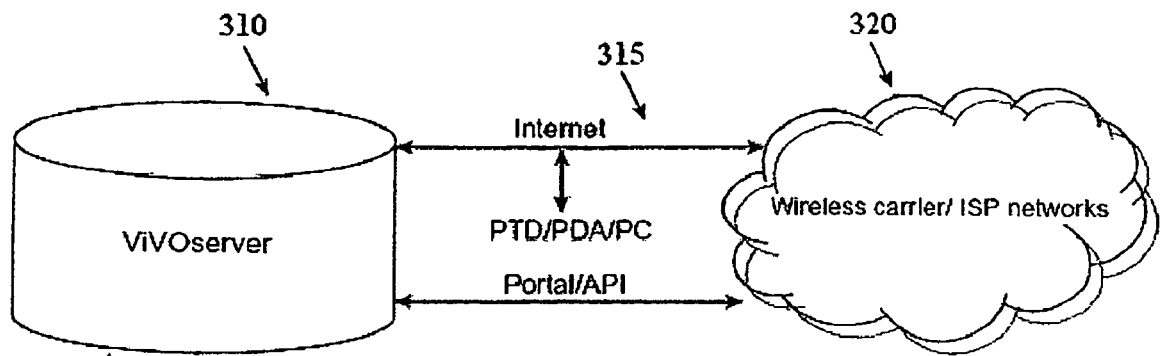

- Communicates and exchanges data with wireless PTD, ViVOwallet web-based and PTD applications, and User's financial institutions

- Communicates via wireless carrier/ISP, Internet, and postal service

- Primary reference system for transactions and balances for synchronization processes with web-based ViVOwallet, PTD, and PC ViVOwallet application

- Generates and/or manages passwords, authentication codes, encryption and cryptography codes, Public Key Infrastructure management, secure communications, and security-related processes

- Provides accounting functions including transaction events, summaries and consolidation, credit card data management, balance transfers, periodic settlement of accounts, and new account additions

- Provides User-defined transaction notification to User via SMS messaging, wireless carrier/ISP networks, text messages, text-to-voice messages, text-to-mail, and text-to-fax messages

- User definable notification of special card-related discounts

- Provides easy sign-up process, maintenance, and management of loyalty SoftCard plug-ins and discount/gift coupon management

- Provides VW application registration, web-based VW hosting, and download

- Initializes and activates PTD and web-based ViVOwallet applications

- Supports Merchant transponder for location-based transactions

- Maintains and facilitates Merchant communications and promotion of one-on-one marketing data to their customers PTD

FIG. 3

| Structure Type | Structure Member | Null? | DataType | Length | Master(*) | User update |
|---|---|---|---|---|---|---|
| User Account Fields | | | | | | |
| CONTACT INFO | ADDRESS_1 | | CHAR | 100 | User | Cell/Web/PC |
| CONTACT INFO | ADDRESS_2 | | CHAR | 100 | User | Cell/Web/PC |
| CONTACT INFO | CITY | | CHAR | 30 | User | Cell/Web/PC |
| CONTACT INFO | STATE | | CHAR | 3 | User | Cell/Web/PC |
| CONTACT INFO | COUNTRY | | CHAR | 30 | User | Cell/Web/PC |
| CONTACT INFO | ZIP | | CHAR | 11 | User | Cell/Web/PC |
| CONTACT INFO | EMAIL_ADDRESS | | CHAR | 50 | User | Cell/Web/PC |
| CONTACT INFO | HOME_PHONE | | CHAR | 15 | User | Cell/Web/PC |
| CONTACT INFO | BUSINESS_PHONE | | CHAR | 15 | User | Cell/Web/PC |
| PERSONAL INFO | FIRST_NAME | NOT NULL | CHAR | 30 | User | Cell/Web/PC |
| PERSONAL INFO | MIDDLE_NAME | | CHAR | 30 | User | Cell/Web/PC |
| PERSONAL INFO | LAST_NAME | NOT NULL | CHAR | 30 | User | Cell/Web/PC |
| SECURITY INFO | SSN | | CHAR | 12 | User | Cell/Web/PC |
| SECURITY INFO | DATE_OF_BIRTH | | CHAR | 11 | User | Cell/Web/PC |
| SECURITY INFO | LEGAL_COUNTRY_RESIDENCE | | CHAR | 30 | User | Cell/Web/PC |
| SECURITY INFO | CITIZENSHIP_STATUS | | CHAR | 9 | User | Cell/Web/PC |
| TBD | FIRST_NAME | NOT NULL | CHAR | 30 | User | Cell/Web/PC |
| TBD | MIDDLE_NAME | | CHAR | 30 | User | Cell/Web/PC |
| TBD | LAST_NAME | NOT NULL | CHAR | 30 | User | Cell/Web/PC |
| TBD | DATE_OF_BIRTH | | CHAR | 11 | User | Cell/Web/PC |
| TBD | SSN | | CHAR | 12 | User | Cell/Web/PC |
| TBD | RELATIONSHIP_NAME | NOT NULL | CHAR | 50 | User | Cell/Web/PC |
| TBD | PIN | NOT NULL | CHAR | 11 | User | Cell/Web/PC |
| TBD | DIGITAL_SIGNATURE | | CHAR | ? | User | Cell/Web/PC |
| PERSONAL INFO | USER_NAME | NOT NULL | CHAR | 30 | User | Cell/Web/PC |
| PERSONAL INFO | PASSWORD | NOT NULL | CHAR | 30 | User | Cell/Web/PC |
| TBD | HOLDER_USER_NAME | NOT NULL | CHAR | 50 | User | Cell/Web/PC |
| TBD | HOLDER_PASSWORD | NOT NULL | CHAR | 50 | User | Cell/Web/PC |

FIG. 8

| Table Name<br>Transaction Fields | Column Name | Null? | DataType | Length | Description | Master(*) | User update |
|---|---|---|---|---|---|---|---|
| TRANSACTION DATA | CREDIT_LIMIT | | FLOAT | 4 | T | Bank | Bank |
| TRANSACTION DATA | CASH_LIMIT | | FLOAT | 4 | T | Bank | Bank |
| TRANSACTION DATA | GENERAL_APR | | FLOAT | 4 | T | Bank | Bank |
| TRANSACTION DATA | CASH_APR | | FLOAT | 4 | T | Bank | Bank |
| TRANSACTION DATA | LATE_CHARGE | | FLOAT | 4 | T | Bank | Bank |
| TRANSACTION DATA | OVER_LIMIT_CHARGE | | FLOAT | 4 | T | Bank | Bank |
| TRANSACTION DATA | FINANCE_CHARGE_PERCENTAGE | | FLOAT | 4 | T | Bank | Bank |
| TRANSACTION DATA | MINIMUM_FINANCE_CHARGE | | LONG | 4 | T | Bank | Bank |
| TRANSACTION DATA | YEAR | NOT NULL | CHAR | 4 | T | Bank | Bank |
| TRANSACTION DATA | NEW_BALANCE | | FLOAT | 4 | T | Bank | Bank |
| TRANSACTION DATA | FINANCE_CHARGE | | FLOAT | 4 | T | Bank | Bank |
| TRANSACTION DATA | BILLING_CYCLE_CLOSE_DATE | | CHAR | 11 | T | Bank | Bank |
| TRANSACTION DATA | BILLING_CYCLE_DAYS | | FLOAT | 4 | T | Bank | Bank |
| TRANSACTION DATA | PAYMENT_DUE_DATE | | CHAR | 11 | T | Bank | Bank |
| TRANSACTION DATA | AVAILABLE_CREDIT | | FLOAT | 4 | T | Bank | Bank |
| TRANSACTION DATA | LATE_CHARGE | | FLOAT | 4 | T | Bank | Bank |
| TRANSACTION DATA | FIN_CHARGE_COMPUTED_ON | | FLOAT | 4 | T | Bank | Bank |
| TRANSACTION DATA | APPROVAL_NUMBER | | CHAR | 100 | T | Bank | Bank |
| TRANSACTION DATA | PARTY_NAME | | CHAR | 100 | T | Bank | Bank |
| TRANSACTION DATA | AMOUNT | | FLOAT | 4 | T | Bank | Bank |
| TRANSACTION DATA | PURCHASE_TYPE | | FLOAT | 4 | T | Bank | Bank |
| TRANSACTION DATA | MONTH_NAME | NOT NULL | CHAR | 30 | T | Bank | Bank |
| TRANSACTION DATA | PURCHASE_APR | | FLOAT | 4 | T | Bank | Bank |
| TRANSACTION DATA | CASH_APR | | FLOAT | 4 | T | Bank | Bank |
| TRANSACTION DATA | TRANSFER_APR | | FLOAT | 4 | T | Bank | Bank |
| TRANSACTION DATA | INTRO_APR | | FLOAT | 4 | T | Bank | Bank |
| TRANSACTION DATA | PURCHASE_APR | | FLOAT | 4 | T | Bank | Bank |
| TRANSACTION DATA | CASH_APR | | FLOAT | 4 | T | Bank | Bank |
| TRANSACTION DATA | TRANSFER_APR | | FLOAT | 4 | T | Bank | Bank |
| TRANSACTION DATA | INTRO_APR | | FLOAT | 4 | T | Bank | Bank |

FIG. 9

| Table Name | Column Name | Null? | DataType | Length | Description | Master(*) | User update |
|---|---|---|---|---|---|---|---|
| Credit Card Fields | | | | | | | |
| CARD INFO | CARD_ACCOUNT_TYPE_NAME | NOT NULL | CHAR | 50 | C | Bank | Bank |
| CARD INFO | FEATURE_1 | | CHAR | 50 | C | Bank | Bank |
| CARD INFO | FEATURE_2 | | CHAR | 50 | C | Bank | Bank |
| CARD INFO | FEATURE_3 | | CHAR | 50 | C | Bank | Bank |
| CARD INFO | FEATURE_4 | | CHAR | 50 | C | Bank | Bank |
| CARD INFO | FEATURE_5 | | CHAR | 50 | C | Bank | Bank |
| CARD INFO | FEATURE_6 | | CHAR | 50 | C | Bank | Bank |
| CARD INFO | FEATURE_7 | | CHAR | 50 | C | Bank | Bank |
| CARD INFO | FEATURE_8 | | CHAR | 50 | C | Bank | Bank |
| CARD INFO | FEATURE_9 | | CHAR | 50 | C | Bank | Bank |
| CARD INFO | FEATURE_10 | | CHAR | 50 | C | Bank | Bank |
| CARD INFO | CARD_ISSUER_CARD_TYPE_NAME | NOT NULL | CHAR | 30 | C | Bank | Bank |
| CARD INFO | PAYMENT_ADDRESS_1 | | CHAR | 100 | C | Bank | Bank |
| CARD INFO | PAYMENT_ADDRESS_2 | | CHAR | 100 | C | Bank | Bank |
| CARD INFO | PAYMENT_CITY | | CHAR | 30 | C | Bank | Bank |
| CARD INFO | PAYMENT_STATE | | CHAR | 3 | C | Bank | Bank |
| CARD INFO | PAYMENT_COUNTRY | | CHAR | 30 | C | Bank | Bank |
| CARD INFO | PAYMENT_ZIP | | CHAR | 11 | C | Bank | Bank |
| CARD INFO | STOLEN_CARD_PHONE_NUMBER | | CHAR | 13 | C | Bank | Bank |
| CARD INFO | CARD_ISSUER_LOGIN_URL | | CHAR | 50 | C | Bank | Bank |
| CARD INFO | CARD_ISSUER_NAME | NOT NULL | CHAR | 100 | C | Bank | Bank |
| CARD INFO | CUSTOMER_CARE_PHONE_NUMBER | | CHAR | 13 | C | Bank | Bank |
| CARD INFO | CARD_NUMBER | NOT NULL | CHAR | 20 | C | Bank | Bank |
| CARD INFO | EXPIRATION_DATE | NOT NULL | CHAR | 10 | C | Bank | Bank |
| CARD INFO | NAME_ON_CARD | | CHAR | 30 | C | Bank | Bank |
| CARD INFO | SECURIT DIGITS | | CHAR | 10 | C | Bank | Bank |
| CARD INFO | TRACK1 DATA | | CHAR | 79 | C | Bank | Bank |
| CARD INFO | TRACK2 DATA | | CHAR | 40 | C | Bank | Bank |
| CARD INFO | TRACK3 DATA | | CHAR | 107 | C | Bank | Bank |
| CARD INFO | CARD_STATUS_DESCRIPTION | NOT NULL | CHAR | 50 | C | Bank | Bank |
| CARD INFO | CARD_TYPE_NAME | NOT NULL | CHAR | 50 | C | Bank | Bank |
| CARD INFO | CURRENCY_DESCRIPTION | NOT NULL | CHAR | 30 | C | Bank | Bank |
| CARD INFO | COUNTRY | NOT NULL | CHAR | 30 | C | Bank | Bank |
| CARD INFO | LANGUAGE | NOT NULL | CHAR | 30 | C | Bank | Bank |
| CARD INFO | COUNTRY | NOT NULL | CHAR | 30 | C | Bank | Bank |

FIG. 10

| ViVOwallet application | Credit/debit/pre-paid/ATM/ loyalty/member SoftCard data |
|---|---|
| ISO/value-added retailer registration with download to PTD via PC cradle | Card issuer provides SoftCard data for user download via cellular/wireless ISP, internet, or media mailing |
| ISO/value-added retailer registration with disk download | ISO/ value added retailer/ cellular operator provides SoftCard data via networked ViVOadapter |
| Merchant value-added download and installation at bundled purchase | ISO/ value added retailer/ cellular operator provides SoftCard data via cellular/wireless ISP, Internet, IR, or other wireless medium |
| ViVOserver registration and DUN/ cellular/wireless ISP download direct to PTD | Merchant ViVOadapter provides card data transfer via local system feedback in the "card reader" mode |
| ViVOserver registration and DUN/ cellular/wireless ISP download to PC for cradle-PTD installation | Merchant ViVOadapter provides SoftCard data transfer via Merchant local network and transfer from Card Issuer and the ViVOserver |
| ViVOtech, Inc. telephone registration and mailing of application disk for PC-cradle installation | ViVOserver provides SoftCard data via internet download or cellular/wireless ISP or Merchants |
| ViVOwallet application on one PTD transfers to another PTD via IR/RF /memory sticks/other device | ViVOtech Inc. provides card data via mailing of plug-in modules, actual coding, or tokens |
|  | ViVOwallet application exchanges card data with another ViVOwallet application |

FIG. 11

COLLABORATIVE NEGOTIATION TECHNIQUES FOR MOBILE PERSONAL TRUSTED DEVICE FINANCIAL TRANSACTIONS

CROSS-REFERENCES TO RELATED APPLICATIONS

This patent application is a continuation of U.S. patent application Ser. No. 11/137,682, filed May 24, 2005, which issued as U.S. Pat. No. 7,494,055 on Feb. 24, 2009, which is a continuation-in-part of U.S. patent application Ser. No. 10/428,502, filed May 2, 2003, a parent application which claims the benefit of Provisional Patent Application 60/411,536, filed Sep. 17, 2002. Both the parent nonprovisional and provisional applications are incorporated by reference herein for all purposes.

BACKGROUND OF THE INVENTION

The present invention relates to techniques for collaboratively negotiating financial transactions, and more particularly, to techniques for accommodating merchant and buyer preferences that relate to financial transactions.

Devices such as personal Digital Assistants (PDAs) and cellular telephones are examples of mobile Personal Trusted Devices (PTDs). As used herein, the term personal trusted device (PTD) refers to a device having processing and storage capabilities allowing it to host and to operate a data aggregation software application useful for managing and manipulating information. Devices falling within this definition may or may not include a display or keyboard, and include but are not limited to cell phones, wireless communication tablets, personal digital assistants, RF proximity chip cards, and laptop personal computers.

PTDs may be able to perform secure data transfer functions such as, for example, hardware identification or software authentication functions that are used in a non-repudiation process with the device creditors or device owners. Many PTDs can communicate via cellular and wireless ISP networks over long distances. Many PTDs can also exchange data over short ranges, typically 1 mm-10 meters, for purposes of secure data sharing between PTD devices and such peripheral devices as printers.

Cellular phones provide a variety of transactional features. For example, cellular phone users can access bank accounts and purchase items from merchants. Consumers are also able to access personal accounts and purchase merchandise via websites and similar portals. Cellular networks can provide support functions such as consumer authentication, device authentication, transaction authorization, event logging, and settlement, all necessary functions for a non-repudiation process typically required by creditors.

An RF proximity chip card is a card that contains an integrated circuit and an antenna for power coupling and data communications. An RF proximity card typically receives power for on-card electronic functions from an induced electromagnetic field generates within about 10 cm of a communications transceiver. Data is transferred to the on-card chip via electromagnetic sub-carriers and switching of the electromagnetic field.

Prior art computers allow users to set preferences associated with financial transaction that are conducted over the internet. For example, a computer user can select a preferred credit card to be used with transactions conducted through a particular web site.

Merchant web sites can also have preferences associated with financial transactions. For example, a merchant may prefer that consumers purchase the merchant's goods using a merchant issued credit card. A merchant may, for example, offer discounts to consumers who use the merchant issued credit card.

However, prior art systems have not provided techniques for resolving differences between a merchant's predefined preferences and a buyer's predefined preferences in a transparent mode. Therefore, it would be desirable to provide techniques for conducting financial transactions that accommodate both the merchant's predefined preferences and the buyer's predefined preferences regarding financial transactions.

BRIEF SUMMARY OF THE INVENTION

The present invention provides techniques for collaboratively negotiating financial transactions between merchants and buyers. Buyers conduct financial transaction using devices such as mobile personal trusted devices (PTDs) and mobile personal computers (PCs) in networked environment that is typically comprises of infrared or long-range transceiver. Merchants typically conduct financial transactions using an electronic merchant point-of-sale system such as a magnetic card acceptance system.

According to the present invention, a user of a mobile PTD/PC sets predefined user preferences that indicate the user's preferred parameters for conducting financial transactions. A merchant sets predefined merchant preferences that indicate the merchant's preferred parameters for conducting financial transactions.

When a financial transaction is initiated, a user preference and a merchant preference are accessed. According to the techniques of the present invention, a negotiated preference is generated that accommodates both the user preference and the merchant preference. If the user preference and the merchant preference are not mutually exclusive, the negotiated preference attempts to satisfy both preferences. If the user preference and the merchant preference are mutually exclusive, the negotiated preference satisfies at least one of the two preferences based on which of the two preferences has a higher priority. The financial transaction is conducted based on the negotiated preference.

A further understanding of the embodiments of the present invention can be made by way of reference to the ensuing detailed description taken in conjunction with the accompanying drawings.

BRIEF DESCRIPTION OF THE DRAWINGS

FIG. 3 is a descriptive diagram of a data management communication system including a dedicated server and wireless carrier/ISP networks according to an embodiment of the present invention;

FIG. 8 illustrates typical user personal data fields that can be used by an FDA application according to embodiments of the present invention;

FIG. 9 illustrates typical user transaction data fields that can be used by an FDA application according embodiments of the present invention;

FIG. 10 illustrates typical user preferences data fields that can be used by an FDA application according to embodiments of the present invention;

FIG. 11 illustrates FDA application and soft-card download methods according to embodiments of the present invention;

DETAILED DESCRIPTION OF THE INVENTION

People using computing devices such as PCs and PTDs are typically referred to as users. People or entities that buy merchandise are typically referred to as buyers, and people or entities that sell merchandise are typically referred to as merchants. With respect to financial transactions conducted over a distributed computing systems, buyers are often referred to simply as users in the present application.

Figure 1:
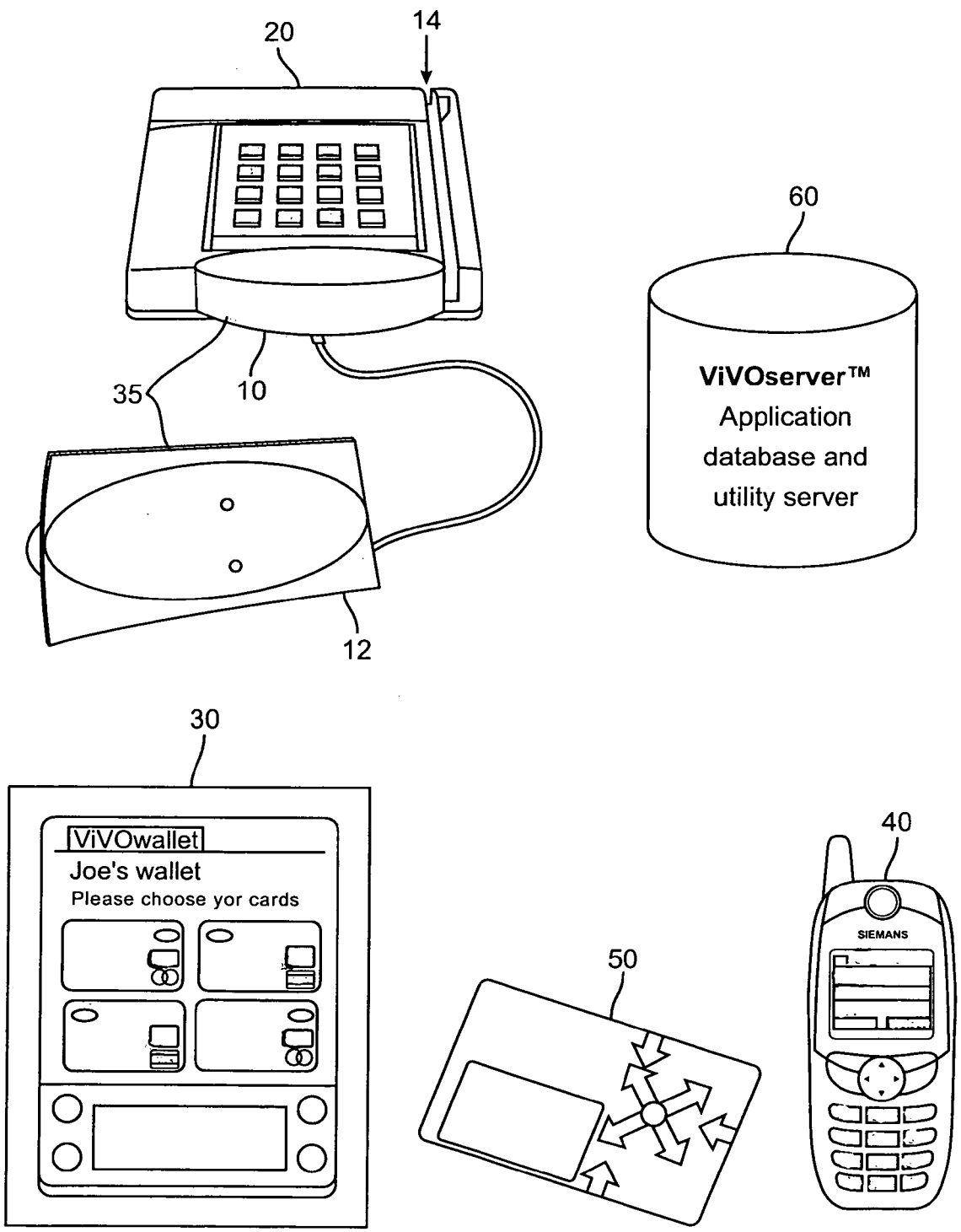
FIG. 1 is an illustration of a POS RF and IR proximity adapter coupled to a conventional magnetic card reader, a dedicated remote server, and a plurality of PTD devices according to embodiments of the present invention.

FIG. 1 is a visual representation of an embodiment of the present invention, and devices that embody features of the present invention. FIG. 1 illustrates a conventional merchant magnetic card acceptance system 20, an adapter 35 of the present invention, and a server 60 of the present invention. ViVOadapter™ is a commercial embodiment of an adapter 35 of the present invention. ViVOserver™ is a commercial embodiment of server 60. FIG. 1 also illustrates a personal digital assistant 30, a cellular telephone 40, and a proximity chip card 50 that embody features of the present invention.

An adapter 35 of the present invention comprises an Merchant pod (M-pod) 10 and a Consumer pod, "C-pod™" 12. M-pod 10 substantially permanently attaches into the Merchant's magnetic stripe card acceptance system 20 via card swipe slot 14. M-pod 10 translates data signals (e.g., infra-red (IR), Bluetooth, IEEE 802.11(b), and cellular-based systems data) received by the C-pod 12, into a digital electromagnetic medium compatible with the conventional magnetic card acceptance system 20.

C-pod 12 is remotely located and acts to communicate with the consumer's mobile financial transaction personal trusted devices (PTDs) that include the personal digital assistant 30, cell phone 40, and RF Proximity Card 50. The server 60 is an internet and cellular/wireless ISP-based server that hosts and provides services according to embodiments of the present invention.

Adapter 35 can establish communications, with multiple format mediums, between the personal mobile financial transaction/PTD devices and card reader 20. Adapter 35 allows concurrent access to the magnetic card swipe/insert reader slot 14 on reader 20. Adapter 35 may have the M-pod and C-pod integrated as a single component.

An FDA application of the present invention that manages financial data and purchase transactions resides on PTDs 30, 40 and 50. Graphical user interfaces of the FDA application are displayed on display screens in PTDs 30 and 40 to guide a user through financial transactions. ViVOwallet™ is a commercial embodiment of an FDA application of the present invention.

Figure 2:
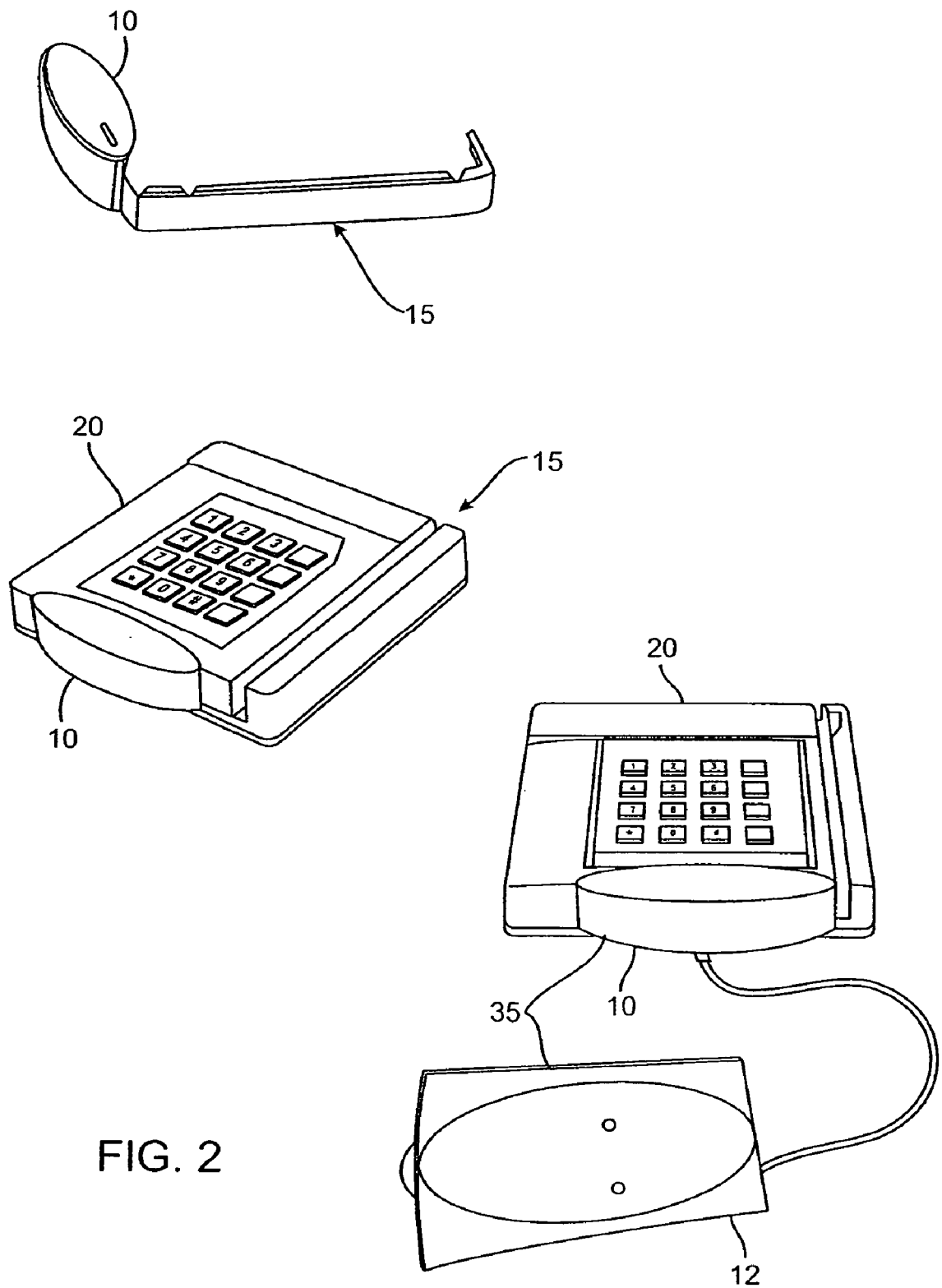
FIG. 2 is an illustration of a POS RF and IR adapter permanent in-slot dual inductor dynamic simulacrum installed with a conventional magnetic card acceptance system according to an embodiment of the present invention.

M-pod 10 includes a permanent in-slot dual inductor dynamic simulacrum 15. FIG. 2 is a representation of a permanent in-slot dual inductor dynamic simulacrum 15 that can be installed with a conventional magnetic card acceptance system 20. Adapter 35 is generally identified for compatibility with existing POS systems that include the magnetic card swipe acceptance systems and the magnetic card insert acceptance systems.

Adapter 35 translates IR and RF signals from the PTD based FDA application to a medium acceptable to existing legacy POS magnetic card swipe/insert acceptance systems. At the same time, adapter 35 ensures continued concurrent access to the card swipe slot 14 for normal transactions with magnetic debit, credit, prepaid, ATM, loyalty, and member cards.

The card swipe acceptance adapter 35 has mechanical design to conform to the POS magnetic card swipe acceptance systems, such as the Verifone Tranz 330/380. The finite thickness tape with the differential inductor simulacrum 15 is aligned and substantially permanently inserted into the card swipe slot 14 and aligned with the existing POS magnetic card acceptance system magnetic reader head component in such a manner as to maintain continued access to the swipe or insert slot for normal card reading functions.

The finite thickness tape with the differential inductor simulacrum 15 is attached to M-pod 10 and substantially permanently placed into a POS magnetic card swipe acceptance system 20 as shown in FIG. 2. Simulacrum 15 is secured with an anchor on the end of the tape or glued on the body of the tape. Simulacrum 14 is designed specifically to allow card swipe action to be effected in the POS magnetic system, whereby a standard magnetic stripe card slides directly between the tape and the POS magnetic card acceptance system magnetic head reader component.

The tape is attached to the POS magnetic card acceptance system via chemical or mechanical means that may include an anchor at the end of the swipe/insert slot. Further details of an adapter for a magnetic card reader with a simulacrum are discussed in commonly-assigned U.S. patent application Ser. No. 10/327,638 to Khan et al., filed Dec. 19, 2002; commonly-assigned U.S. patent application Ser. No. 10/306,618 to Fernandes, filed Nov. 27, 2002; and commonly-assigned PCT Patent Application PCT/US02/41008 to Fernandes et al., filed Dec. 19, 2002, all three of which are incorporated by reference herein.

Further embodiments of adapter 35 include an integral cellular/wireless ISP data transceiver, typically integrated for PTD-wireless network/ISP and PTD-adapter RF and SMS (Short Messaging Service) protocol communications for transactions beyond infrared distances.

An alternate embodiment of an adapter of the present invention is the integration of a cellular transceiver device. This embodiment will enable the user to dial the number associated with the adapter and effect a purchase via direct PTD to adapter communications, via a wireless carrier/ISP network, or via SMS protocols. This integral transceiver allows on-line transactions with the support of server 60, and off-line transactions with the use of such tokens as gift cards, coupons, and prepaid monetary representations.

A benefit of this configuration is that the user effects a transaction via different short and long-range mediums, including the internet, wireless carrier/ISP, IR, IEEE 802.11 (a) (b), Bluetooth, and SMS. The integrated wireless network data transceiver also enables Merchant data sharing and transaction digital receipt generation. Additionally, the transceiver accommodates on-line and off-line transactions.

According to one embodiment, adapter 35 can capture magnetic card data during the normal card swipe process, encrypt this data in secure manner, and transmit it to an FDA application in the form of a Soft-Card. Concurrent use of the card swipe slot by the adapter 35 and the user magnetic card is an important feature of this process.

FIG. 3 is a descriptive diagram of the network-based server 60 database management system that augments and supports accounting functions, such as Billing on Behalf of Others (e.g., Buyers), by cellular operators and wireless ISP operators. This system can be integrated with the cellular and wireless ISP operators, or can be a separate commercial product for this purpose.

According to one embodiment of the present invention, server 60 provides accounting functions such as billing for financial transactions, only if a cellular or ISP service does not provide these features. If a cellular or ISP service provides accounting functions to PTDs/PCs, server 60 is not needed to provide these functions.

According to an embodiment of the present invention, server 60 includes a database management system. This database management system can communicate and exchange user data and financial data with a user's PTD/PDA and a user's personal computer (PC) via internet 65, via wireless carrier/ISP networks 66, and/or via Applications Program Interface (API) portal 67 to a cellular/wireless network.

Server 60 hosts web-based applications in a secure and private process. Server 60 also provides user registration and application downloads. In FIG. 3 and other figures herein, the FDA application is referred to VIVOwallet or VW.

A Soft-Card is an electronic card that is associated with a user account (such as a credit card account or a membership in a merchant loyalty program). An icon is typically displayed on a PTD to identify a Soft-Card to a user.

Server 60 hosts data associated with Soft-Cards. Soft-Card data can, for example, include a user name, address, and account number. Soft-Card data can also include data encoded in magnetic cards on track #1 and track #2. Soft-Card data may also include proprietary data on track #3 that may be required by ATM machines. The data on magnetic card tracks #1 and #2 is presently used for transaction processing by clearing houses, card transaction authorizers, and card acquirers. The proprietary data on any track may be required by card issuers/acquirers and ViVOtech, Inc. to verify that transactions were effected with an FDA application. The security of an FDA application results in lower transaction fraudulent risk to the card issuer and resultant lower interest and transaction processing fees. The fee difference may provide a revenue for ViVOtech.

Server 60 is the primary reference system for pay-and-go, single-step, and peer-to-peer transactions. Server 60 performs functions such as providing notification of transactions to remote systems. Server 60 also has processes that synchronize communicates and data exchange between PTD and PC based applications of the present invention. Server 60 generates and/or manages passwords, authentication codes, encryption codes, and keys, and maintains the Public Key Infrastructure (PKI), and dynamic CVCC-type codes to provide more secure transactions.

Server 60 enables a user to manage multiple cards and banking accounts. Server 60 communicates with internet-based Personal Computer systems via the internet 65. Server 60 communicates with FDA applications via PTD wireless carrier/ISP network 66 or via API portal 67.

Server 60 maintains a user application that includes personal user information, user device synchronization services, and financial transaction data relating to issued cards. The transaction data is used to associate purchases from a PTD or PC with acquirer transaction data.

Server 60 maintains merchant loyalty programs and offers them to the user in the form of "Merchant loyalty plug-in" modules. The loyalty plug-in modules self-configure based upon a user's personal data fields shown in FIG. 8.

Server 60 also maintains and facilitates communications and data exchange from merchants to customers' PTDs. For example, server 60 can facilitate the transfer of promotions and one-on-one marketing data to customers' PTDs.

A benefit of the internet-based server 60 is that it aggregates all of the financial and card information provided by a user. Another benefit of server 60 is that, upon request by the user, it acts as an intermediary for consolidated payments and settlements (e.g., between a customer using a PTD device and a merchant via at a magnetic card reader). A user (e.g., merchant or consumer) can send data to server 60 from a mobile or stationary device. Thus, users are not restricted to a specific location.

Further, server 60 notifies PTD and PC users of transaction events. Notification can be in the form of SMS messaging, text messages, text-to-voice, text-to-e-mail, and text-to-fax. Server 60 can exchange money for tokens, similar to the Pay-Pal™ and Yahoo! Pay-Direct™ processes that currently exist for Internet purchases. A user can direct server 60 to render invalid all cards referenced on the database management system in the event of loss or theft of the user's cards. This is advantageous as a one-call notification of lost cards so that all associated card issuers can be notified.

Figure 4:
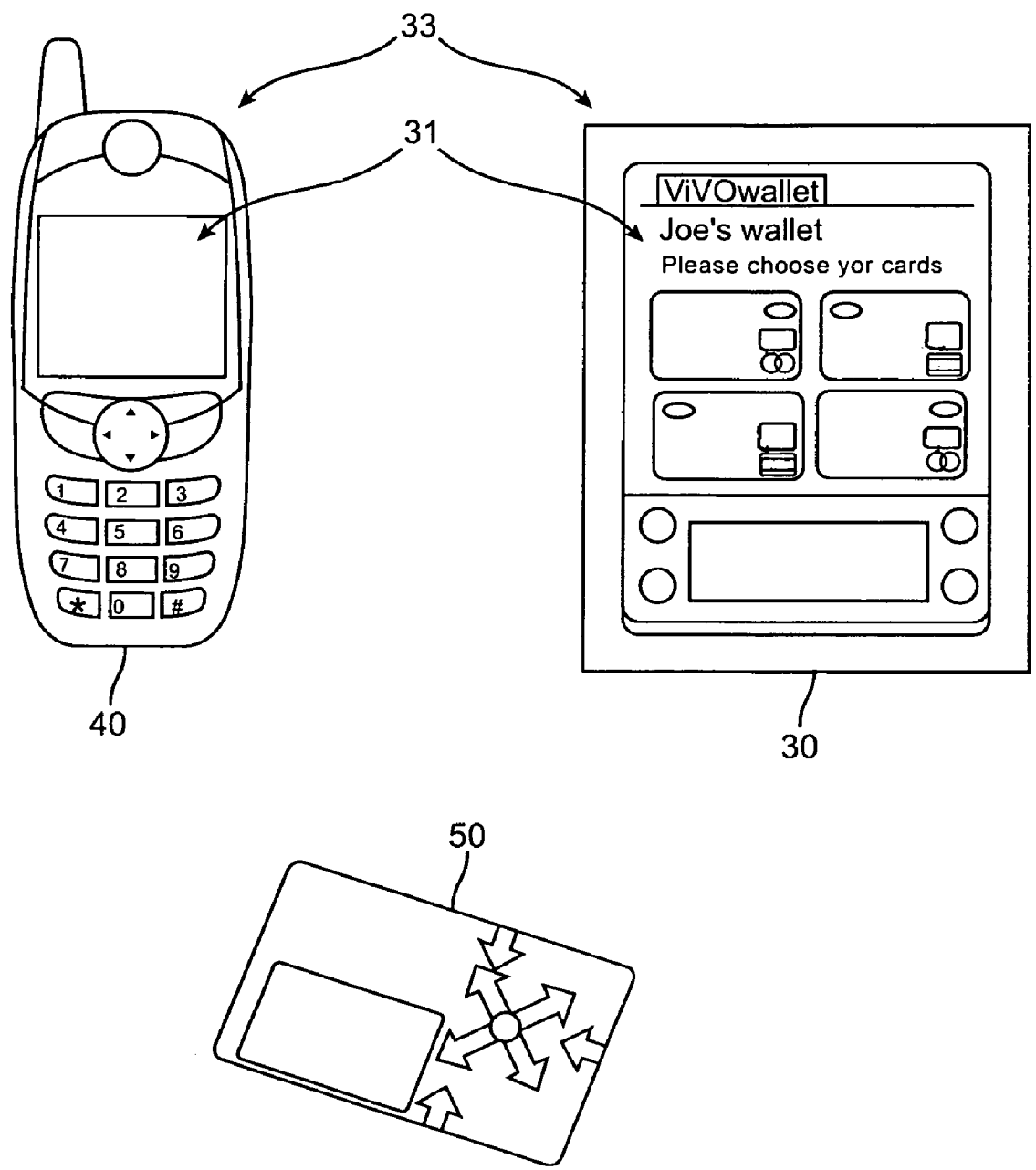
FIG. 4 illustrates three wireless Personal Trusted Devices (PTD) including user interfaces provided by an FDA application according to embodiments of the present invention.

In FIG. 4, three common variations of Personal Trusted Devices (PTD) are depicted as a cellular phone 40, Personal Digital Assistant (PDA) 30, and a Radio Frequency proximity card (RF proximity card) 50. The devices shown in FIG. 4 are examples of mobile devices that can host a financial data aggregation application (i.e., FDA application) according to the present invention. An example of a user interface 31 generated by a financial data aggregation application is shown on the view screens of devices 30 and 40 in FIG. 4.

RF proximity card 50 also embodies features of the present invention. For example, card 50 operates an embedded, non-user interface, version of the financial data aggregation application. The RF proximity card is a card that typically has an integral and internal coil/antenna. An RF proximity card can exchange data with adapter 35 from a distance without physically contacting the adapter. Conventional magnetic cards, on the other hand, have to be swiped through a card reader. The coil antenna of an RF proximity card conducts radio frequency (RF) inductive coupled communications with a host system using RF proximity card issuer proprietary protocols or those associated with standards ISO/IEC 14443 type A/B and ISO/IEC 15693. The RF signals allow an RF proximity card to communicate with a host system such as a magnetic stripe card acceptance system from a short distance.

RF proximity cards typically have microprocessors that are used for communications and security protocols as well as RAM, ROM, and microcode that supports the microprocessor. These on-board components and code enable the card to implement challenge authentication routines, data ciphering for secure data transfer, and non-repudiation schemes. The non repudiation schemes can, for example, operate by exchanging network authorization server codes and unique identifier codes between manufacturers, issuers, acquirers, authenticators, or third parties designated or authorized by an entity such as ViVOtech, Inc.

The RF proximity cards are typically categorized as passive and active. The RF proximity cards contain financial transaction data typical to credit, debit, ATM, pre-pay, loyalty, and other magnetic stripe cards. The construction and proximity operations of RF proximity cards is specified in ISO 14443 type A/B and ISO 15693 protocols. Data storage and communications specifications are typically proprietary to the card issuer. Typical RF cards are highly rugged for extreme environments and are not susceptible to data loss through magnetic or mechanical means. On the other hand, ISO/IEC 7811 standard formats that are used for conventional magnetic stripe cards are more susceptible to data loss through magnetic or mechanical means.

A benefit of the use of RF proximity cards is the privacy and security that is achieved by the short range communications distance defined by ISO 14443 Type A/B and ISO 15693 protocol standards specifications. This protocol defines close-coupled inductive communications interface and data exchange at distances equal or less than 10 cm.

The close-proximity communications of these cards is inherently more secure than long distance communications. Also, the close-proximity communications of these cards uses less computationally intensive cipher schemes than the omni-directional longer range Bluetooth radiation protocols, or the longer distance IrDA or consumer infrared optical communications protocols. RF proximity card hardware components and supporting circuitry are cost effective relative to the much higher cost of RF and IR components and supporting circuitry. This is advantageous for the user of RF proximity cards.

Additionally, the RF proximity card is contactless and has no active user interface. This lack of user interface ensures ease of user acceptance with minimal user interaction. To use an RF proximity card, a user merely has to introduce the card to the RF capable adapter 35 within the required distance for a period of time sufficient to meet transparent and proprietary communications protocols and data exchange requirements.

Cell phone 40 and PDA 30 have cellular/wireless ISP transceivers and an integral Infrared (IR) communications device 33. This Infrared communications device typically references and/or conforms to Infrared Device Association (Irda v1.2 and higher) communications protocols, allowing diverse devices to communicate with a standard protocol. Optional amplifiers can enable IR communications beyond the IrDA 1.2 specification distance. Amplifiers have demonstrated reliable communications up to 50 meters.

PTD graphics interfaces 31 are examples of interfaces that can be presented by a financial management application of the present invention residing on devices 30 and 40. The financial management application includes the pay-and-go feature that has controlling access to the integrated IR communications device 33 to effect communications with the RF adapter 35.

Cell phone 40 and PDA device 30 typically utilize subscriber prepay or credit services with routine and periodic billing by the wireless carrier/ISP. The wireless carrier/ISP can be a commercial service provider. The wireless carrier ISP can support voice and/or data transmission with typical network sharing methods of CDMA/CDPD/TDMA/GSM/ and future spectrum sharing methods with a cell phone or other PTD. The wireless carrier ISP can communicate via proprietary wireless infrastructure or via a wired interface with transmission cells/nodes and "bridges" with wired carriers and their services. The wireless carrier ISP can also communicate with seller Point-of-Sale (POS) local area network gateways to cover areas not serviced by the wireless cell nodes.

The PTD devices have unique identifier codes that include Subscriber Identification Modules (SIM), Electronic Identification Numbers (EIN) and Caller Identification (Caller ID), and other unique subscriber identification codes. The unique identifier codes associate usage to a unique subscriber in a non-repudiation scheme/method typical to the credit/debit/ ATM industry via personal identification number (PIN) codes, and the cellular phone industry via SIM/EIN/Caller ID codes.

These devices typically establish connection with the wireless carrier/ISP via a secure connection. The voice and/or data is encrypted for security. All transactions via the PTD integral electromagnetic communications systems are secured via standard cryptographic measures. These measures include asymmetrical RSA key generation within the Public Key Infrastructure (PKI) protocols and DES/AES symmetric key generation by the sending and the receiving devices. The resident database and financial applications programs are secured with local cryptographic measures that include password access typical to most applications.

A benefit of the wireless network-based PTD is that financial transactions are conducted in near real-time. Transactions are processed and notifications are sent within seconds or minutes of the actual transaction. Additional benefits are provided by the use of "strong" cryptography that encodes credit/debit/ATM/pre-paid/loyalty/member card information and maintains security in real-time.

"Strong cryptography" is generally defined as 1024 bit asymmetric keys generated by RSA methods, particularly the D-H algorithm, for Public Key Infrastructure, and 128 bit "DES/AES," or similar for symmetric key generation typically found on cell phones and smart cards.

A benefit of the use of infrared communications is the privacy achieved by short range communications distance and communications "cone" of + and −15 degrees maximum off-axis, as defined by the Irda v1.2 communications specification. This protocol defines high-speed digital bit patterns transmitted by the electro-optical infrared devices for reliability of data transfer over a short-range distance of approximately 1 mm-1 meter. IR hardware components and supporting circuitry are cost effective relative to the much higher cost of RF components and supporting circuitry.

Figure 5:
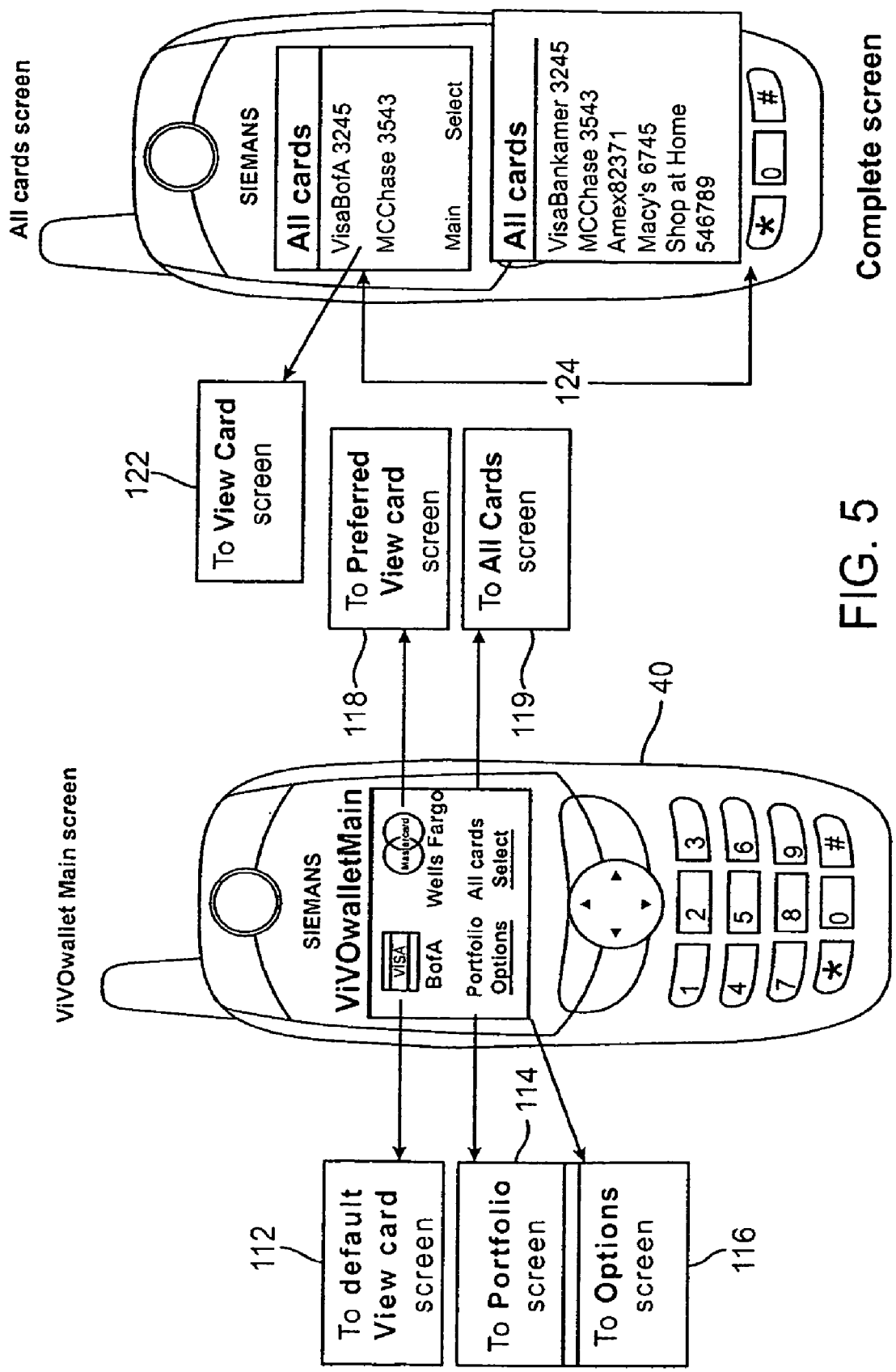
FIG. 5 illustrates FDA application user interfaces on cellular phones for enabling a user to select a payment method to complete a purchase transaction according to an embodiment of the present invention.

FIG. 5 is a graphical user interface provided by an FDA application of the present invention on a display screen of cellular phone 40. The user interface illustrates the sequence of card data in the FDA application. FIG. 5 shows how symbols associated with card issuing and card standards bodies are used by the FDA application.

The graphic interface includes links to default card 112, the portfolio screen 114, the options screen 116, the preferred view card 118, and the all cards screen 119. The all cards screen image can include Soft-Cards 122 installed on the PTD. Device button sequencing can be used to access all cards 124 in a manner typical to PTD. The physical sequencing of application data is typically controlled by the PTD manufacturer and the card issuer/banks maintain the icons and trade names.

Figure 6:
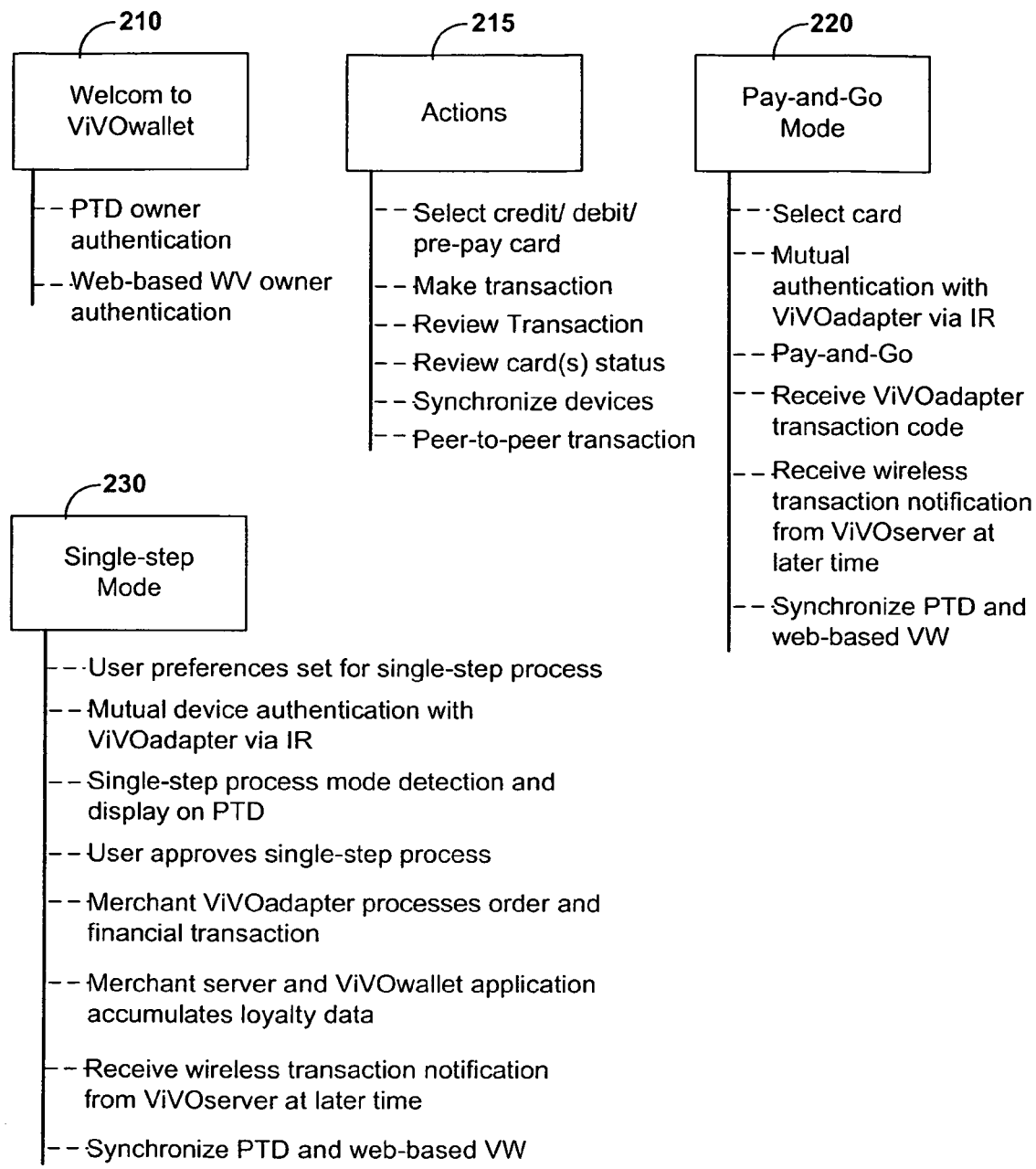
FIG. 6 is a diagram describing features of an FDA application according to an embodiment of the present invention.

FIG. 6 illustrates examples of steps that a financial data aggregation application can provide to a user. The steps shows in FIG. 6 are merely illustrative and are not intended to limit the scope of the present invention. As discussed above, the financial data aggregation (FDA) application can function on a user's PTD device or personal computer. The financial data aggregation application first provides step 210, in which is a welcome screen identifies the application and requests the user to log on with a password for authentication purposes. PTD users and web-based users are then authenticated.

In steps 215, the FDA application allows a user to select a credit, debit, prepay, or other type of credit card with an associated PIN, or a global PIN for all cards. These cards are soft-cards in that data residing locally or remotely allows a user access to some type of account, much the same as a conventional credit, ATM, or debit card. The soft-card data is securely maintained by the FDA application or remotely on server 60. The user can then make a transaction such as buying merchandise from a merchant. The FDA application reviews the transaction and the card status. The FDA application can then synchronize the user's device with the merchant device (e.g., adapter 35), another user's device, or other remote device (e.g., server 60) and begins a peer-to-peer transaction.

A user can also select the pay-and-go feature 220, or the single-step feature 230, for mutual authentication of the user's PTD and a merchant's adapter 35. In each mode, the user's device and the merchant's device are authenticated for security purposes, although the pay-and-go feature allows the user to set a pre-defined transaction limit that can be effected without a security PIN. In the single step mode 230, the user can receive loyalty data such as coupons or discounts. Server 60 can act as a intermediary between the user's device and the merchants device.

The user can orient a cell phone IR communications component at pod 12 within a typical distance of 1 millimeter to 1 meter. Adapter 35 acknowledges the request and establishes inter-device communications, exchanges mutual authentication processes, and establishes a data encryption key for a secure data transmission session when wireless and infrared network communication is present.

The user can approve every step of the transaction process via pre-defined preferences or active real-time negotiation. The user can acquire merchant loyalty/member benefits in real-time, or post-transaction with reconciliation by server 60 or the cellular/wireless ISP operator actions, if provided. The user can synchronize the application, review card status, make transactions in physical space or virtual internet space, and make payments to the card issuers/acquirers.

FDA application receives magnetic card data directly from adapter 35, as described above. The user can cancel, override, and maintain full transaction options at any point during the transaction process. The user also has remote cancel and erase functions via the server-based FDA application and the PTD-based FDA application. Soft-Card data always remains under full control of the user, and may be cancelled, erased, transported, or otherwise modified only by the User, server 60, or the card issuer.

An additional data string can be appended to data exchanges involving transactions with server 60. This data string will include part of a unique message transaction code such as a message digest, digital signature, or a device serial number. This data string may be ViVOtech, Inc. company proprietary, or a cooperative of card issuers/acquirers/transaction authorizers and may be used for such purposes, though not limited to, transaction profiling, non-repudiation, event logging, merchant adapter association, etc.

The data string can identify a Merchant associated with a stolen transaction. For example, the data string can identify the owner of an adapter 35 used to conduct a transaction with a stolen credit card.

An embedded version of the FDA application can reside on RF card 50. The embedded FDA application on card 50 includes Soft-Card data that can be managed by server 60. A processor on card 50 can automatically present specific soft-cards to adapter 35 upon interrogation by adapter 35. The embedded FDA application can maintain soft-cards such as credit, debit, loyalty, ATM, pre-paid, and member cards. The embedded version of the FDA application does not have an RF card user interface, but can be managed by the user via the FDA application residing on server 60.

An important aspect of the FDA application is the ability to effect collaborative negotiations between the PTD and adapter 35. This reduces merchant risk and emphasizes merchant-buyer relations.

As discussed above, a benefit of RF proximity cards is that they require short distance communications. An internet or verbal-based exchange of card data is less secure, and therefore incurs higher transaction fees, higher vendor qualification, and higher vendor risk. A short distance transaction is more secure because of standard methods of user identification available to a merchant. Card data can be transferred in a secure process using a non-repudiation scheme that associates the transaction with unique PTD serial numbers, FDA serial numbers, and user parameters such as a PIN.

A benefit of providing the FDA application on a wireless network-based PTD is that an unlimited number of consumer cards can be aggregated. The consumer soft-cards can be maintained on server 60 and the PTD for access by the consumer. By providing numerous soft-cards that are accessible from a PTD, card "bulk" in the consumer's wallet is substantially reduced. This system also increases security of the data maintained on existing cards by providing encryption and the other data security techniques mentioned above.

Other features of the FDA application on a PTD include the ability to effect financial transactions via infrared (IR) signals, Short Messaging Service (SMS) protocol and networks, text paging, and via radio-frequency signals on a device-to-device means or via the wireless carrier/ISP network.

Another benefit of this process is the low cost of wireless communication sessions and resultant fees associated with the transaction costs relative to wired carriers. Also, cell phones and other PTDs typically have non-repudiation schemes that provide "strong" encryption standards ensuring lower "card present" transaction fees.

Figure 7:
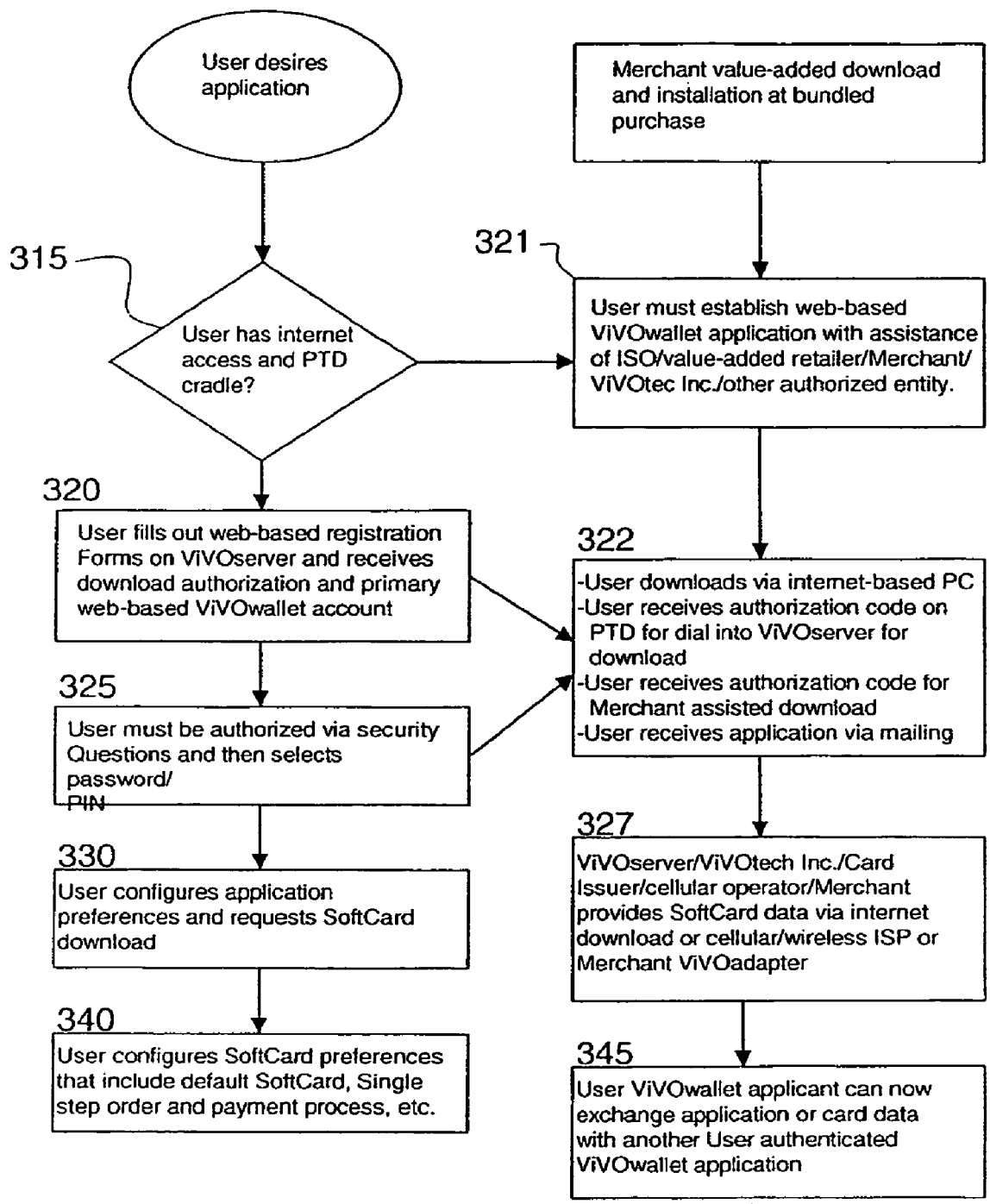
FIG. 7 illustrates an FDA application registration and download process according to an embodiment of the present invention.

FIG. 7 is a flow chart that illustrates examples of the FDA application downloading and installation steps that can be performed by an FDA application of the present invention. At decision step 315, the process determines if the user has internet access and a PTD cradle. If so, the user completes a web-based registration form on server 60 and receives download authorization and a primary web-based FDA application at step 320. At step 325, the user authenticates his FDA application with security protocols that can include a PIN/password. At step 330, the user configures the FDA application preferences, and requests a soft-card download. At step 340, the user configures soft-card preferences that can include a default soft-card or a single step order and payment process.

If the user does not have internet access and a PTD cradle, the user must establish a web-based FDA application with an authorized entity at step 321. The user downloads the FDA application and authorization codes at step 322. The user downloads Soft-Card data at step 327. The user can exchange FDA application data with other user authenticated FDA applications at step 345.

Alternatively, the User can download the FDA application directly to the PTD from the cellular/wireless ISP. The FDA application can be downloaded, for example, by dialing or saying, if applicable service is available from server 60 or the cellular/wireless ISP provider, a specific number and establishing mutual authentication with a unique PIN/password provided to the user during the initial registration process.

Alternatively, the FDA application can be mailed to the user. In this embodiment, the installation processes similar to the PTD cellular/wireless ISP process. Alternatively, the FDA application can be installed at an Independent Sales Organization (ISO) or a retailer.

In a further embodiment, the FDA application can be transferred from one PTD that has an FDA application, to another PTD that meets the FDA application's minimum device specifications. In this instance, only the application, and not the personal user data or soft cards, will be transferred. The new user must then proceed with registration and soft card download using the methods described herein.

FIG. 8 is a table that lists examples of typical FDA application user personal data fields. These example fields include the user's name, address, and other information that is typically used in financial transactions. The data corresponding to the user fields is maintained in an encrypted and secure database within the FDA application on the PTD, or other user computer and on server 60.

According to an embodiment of the present invention, the data associated with the user fields can be used as merchant Soft-Card data or by merchant loyalty "plug-ins." These features of the present invention are discussed further below with respect to FIGS. 11 and 12. The merchant loyalty plug-ins are software modules that are made available to the user, e.g. via server 60, and accessible by wireless ISP/cellular network, the internet, and the merchant's network. The plug-ins are self-configuring, based upon the user's personal data and any qualifications of the merchant. The plug-ins are described in FIG. 12, with download description in FIG. 11.

FIG. 9 is a table that lists examples of typical FDA application user transaction data fields. These transaction data fields are typically associated with time, amount, Merchant, limits, billing cycles, transaction approval codes, and other data associated with the transactions routed from the card acquirer and clearing house to server 60. The user can obtain this data after the transaction and consolidation on server-based FDA application, with manual or automatic synchronization, dependent upon user preferences.

According to an embodiment of the present invention, server-specific code is appended to each transaction data field to consolidate transactions, loyalty programs, merchant coupons, gift certificates, and other financial instruments. This server-specific code can include security data for correlation with card issuer's security codes and single transaction authorization transaction codes.

FIG. 10 is a table that lists examples of typical FDA application user preference data fields. These data fields are used for user-defined associations between Merchants, Soft-Cards, Merchant/Buyer in Peer-to-Peer modes, and transaction amount levels, and for synchronization with the User's computer and other User's other authorized FDA applications. This data is synchronized via IR signals, wireless ISP/Cellular networks, the internet, and network or PC cradles with interconnect wires. The single-step and normal negotiated purchase preferences, default Soft-Card preferences, auto-sequences for collaborative Merchant negotiations regarding such items as preferred Soft-Card and transaction limits requiring a PIN/password are defined by the User in this table.

The fields in FIG. 10 can be used by the embedded FDA application on the RF proximity cards, and other "smart" or "chip" cards. These RF proximity cards do not have an active user interface on the card. Therefore, the User has to define purchase preferences via the web or wireless carrier/ISP network that allow the embedded FDA application to auto-select the relevant card based upon collaborative negotiations performed by adapter 35 or PTD Peer-to-Peer collaborative negotiations. Alternatively, the RF proximity card may obtain card data via a variation of adapter 35 that includes a magnetic stripe card swipe device with ability to transmit this magnetic card data via the ISO/IEC 14443 type A and B and the ISO/IEC 15693 RF induced field protocols. Further details of this type of adapter are discussed in U.S. patent application Ser. No. 10/428,910, filed concurrently herewith, to Khan et al., which is incorporated by reference herein.

According to a further embodiment of the present invention, the user preference data controls the sequence of cards presented in negotiations with a Merchant. For example, the User/Buyer may define the preferred sequence usage of card "A", then usage of card "B", and finally usage of the Merchant's card "C". In this example, the Merchant may require the use of their loyalty/member card to obtain certain discounts or loyalty program benefits, that may be unknown to the Buyer, and the FDA application described herein will automatically sequence to the Merchant's preferred card, if the user preferences allow.

The Buyer's FDA application receives these Merchant's preferences and auto-sequences to the Merchant requirements, if allowed by the User's preferences. This action enables the Buyer to obtain the Merchant loyalty/member benefits in a transparent transaction process. The Buyer may also be advised of the request to use the Merchant loyalty/member preferences. The Buyer always has control of the Soft-Card data proffered. The Merchant always has control of the minimum requirements for the transaction. This reduces the Merchant's transaction risk, as defined by the Merchant, and benefits the Buyer. Another advantage is that the user may define spending limits associated with specific cards and discount preferences associated with specific cards. In some instances, a user can transfer purchases from a first card to a second card after the transaction.

FIG. 11 identifies examples of how an FDA (ViVOWallet) application (left column) and Soft-Card data (right column)

can be downloaded onto a PTD. The FDA application and Soft-Card data can be downloaded by the PTD via a PC cradle, disk module, memory module, CD-ROM storage media, Merchant IR or RF kiosk, Merchant or POS system, adapter 35 with application in resident memory, via a Merchant or ISO network server, direct from server 60 through cellular/wireless ISP network or API portal, via the User's PC, or via PTD-PTD transfers with such mediums as IR and memory module.

The Soft-Card data can also be downloaded to the FDA application from adapter 35. The Merchant/ISO can offer manual programming of loyalty/member card data directly into the FDA application. Additionally, gift-cards that are prepaid can be transferred according to these identified processes.

The adapter 35 can acquire magnetic card data from the User's card and transmit it to the User's FDA application. Adapter 35 can transfer Merchant loyalty/member Soft-Card data directly to the FDA application through any suitable network.

Figure 12:
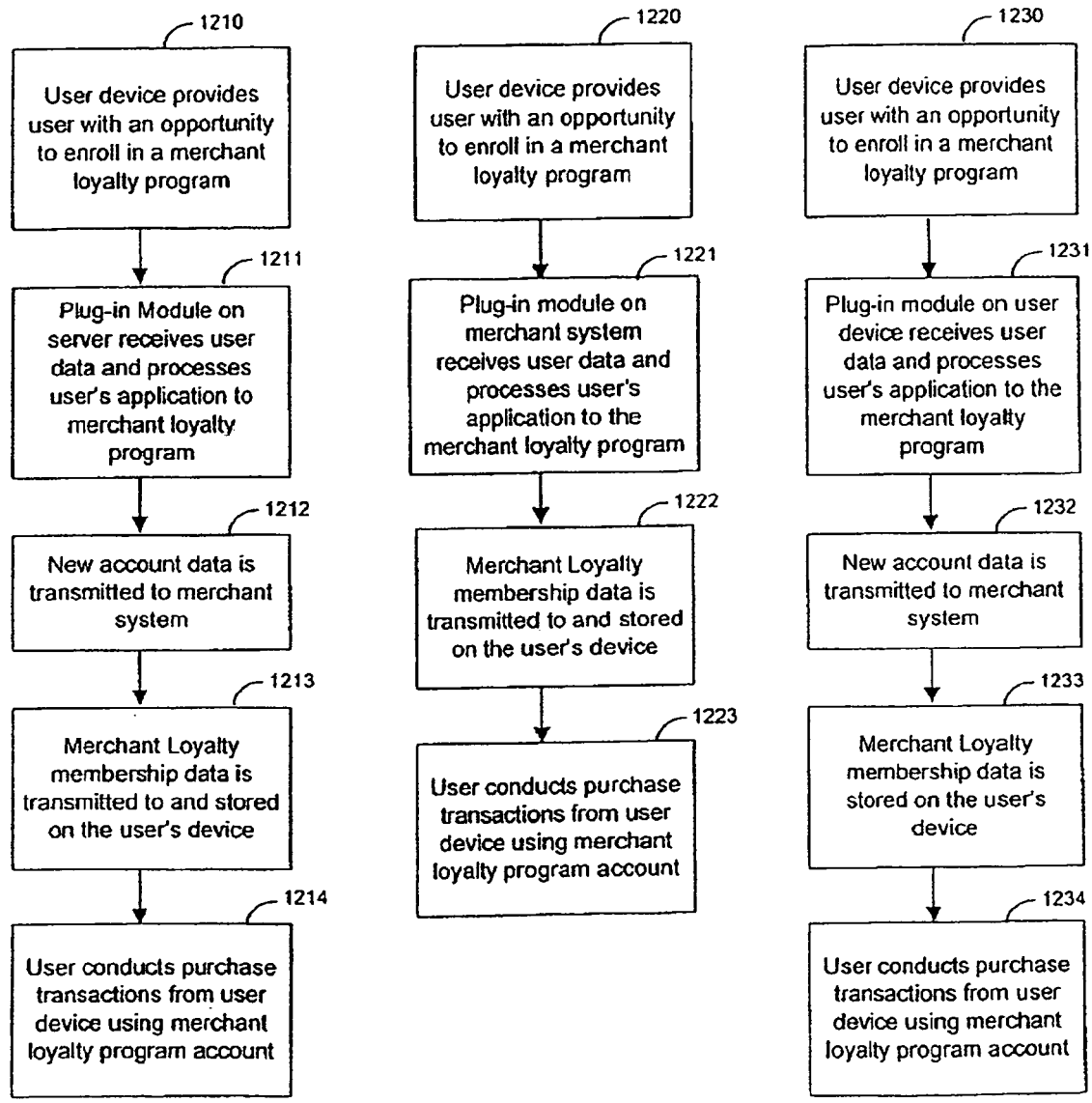
FIG. 12 illustrates a network-based merchant loyalty plug-in process according to embodiments of the present invention.

FIG. 12 is a diagram of self-configuring merchant loyalty registration processes. The steps shown in FIG. 12 are merely examples of steps that can be implemented according to particular embodiments of the present invention. The steps shown in FIG. 12 are not intended to limit the scope of the present invention in any way.

Examples of merchant loyalty programs are programs that provide discounts only available to members, such as frequent flier programs and diner's club card programs.

According to the embodiments of the present invention illustrated in FIG. 12, a software plug-in module automatically registers a user of an FDA application with a merchant loyalty program. No direct human intervention is required to register a user in a merchant loyalty program, except some indication by the user that he or she desires a membership in the loyalty program. Because no other human intervention is required, merchant loyalty plug-in modules of the present invention are self-configuring.

A plug-in module of the present invention accesses a user's personal data from a user database, and automatically registers a user with a merchant loyalty program in response to a user's request for membership in the loyalty program. A plug-in module of the present invention can ensure that any qualifications required by the Merchant are meet before a user is registered in the loyalty program.

A merchant loyalty plug-in module of the present invention can register a user with numerous merchant loyalty programs that are provided by multiple merchants. Thus, a user can register with multiple merchant loyalty programs using the same familiar registration system that is conveniently provided through a user's cell phone, PDA, personal computer, or other user device.

Merchant loyalty plug-in modules of the present invention can run on server 60, a user's PTD, a user's PC, or on a merchant computer system. The merchant computer system can be located, for example, at an attended or unattended merchant kiosk. The merchant computer system can be in communication with the merchant point-of-sale (POS) system. As discussed above, the merchant POS system can include adapter 35. The plug-in modules can be accessible by a wireless ISP/Cellular network, the internet, or via the Merchant's network.

Three example processes for automatically registering a user in a merchant loyalty program are described in FIG. 12. According to the first embodiment, a plug-in module operating on server 60 automatically registers a user in a merchant loyalty program as shown in steps 1210-1214. According to the second embodiment, a plug-in module operating on a merchant system automatically registers a user in a merchant loyalty program as shown in steps 1220-1223. According to the third embodiment, a plug-in module operating on a user device automatically registers a user in a merchant loyalty program as shown in steps 1230-1234.

In step 1210/1220/1230, a user computing device (e.g., PC, PTD, etc.) provides the user with an opportunity to enroll in a merchant loyalty program. The user then selects a particular merchant loyalty program. In one embodiment, the user's device requires the user to log into an account maintained by server 60 before the user can select a merchant loyalty program.

The user can indicate a desire to enroll in a merchant loyalty program by actively selecting an option on a user interface screen on the user computing device. For example, the user can initiate or confirm a request to register in a specific merchant loyalty program that is displayed and offered by server 60 or the user's PTD. The user's request can be transmitted as an electronic message to server 60 or a merchant computer system.

In another embodiment, a user can request to enroll in a merchant loyalty program during a purchase transaction. In this embodiment, a merchant point-of-sale computing system can send an electronic notification to the user computing device during the purchase transaction asking the user whether wants to enroll in a particular merchant loyalty program. The user can indicate a desire to enroll in the loyalty program by sending an electronic message back to the merchant system to obtain a discount or other benefit for the purchase transaction that is presently being conducted.

Alternatively, a user can define a user preference that indicates the user wants to register in all merchant loyalty programs of a certain type (or any type) that he is eligible to register in. A merchant loyalty plug-in module then automatically registers the user in merchant loyalty programs that fall into the categories selected by the user.

According to one embodiment, a plug-in module can automatically register a user with a loyalty program when the user purchases an item from a merchant. For example, a PTD can automatically send a request to a merchant point-of-sale system to initiate the user's registration in a merchant loyalty program during a financial transaction in response to a user's predefined preference. As another example, during the purchase transaction, a merchant point-of-sale system can send an electronic message to the user's PTD requesting that the user enroll in a merchant loyalty program. The PTD can respond to the request by sending an electronic message to the merchant's point-of-sale terminal indicating the user's intent to join the merchant loyalty program. The electronic message includes at least some of the data pertaining to the user profile and all the information necessary to enroll the user in the merchant loyalty program. A financial transaction is then conducted through the merchant point-of-sale system using a user account. The user receives credit for the financial transaction in the merchant loyalty program.

At step 1211/1221/1231, the merchant loyalty plug-in module receives user data and processes the user's membership application to the merchant loyalty program. The plug-in module can receive the user data, for example, by automatically accessing the user's profile data from a user profile database. The user profile data can include, for example, the user's name, address, a user's preset preferences, account information relating to particular soft cards or bank accounts, a history of the user's transactions, and any other useful information. The user profile database can be stored at any suitable location (e.g., at server 60) and is in secure communication with the user device and/or the merchant computer system.

The plug-in module can processes the membership application by automatically filling out an electronic application form. The plug-in module can fill out a form by automatically entering user data into the appropriate fields of the membership application form. Each piece of user data in the user profile database can be associated with a particular data type or data field (such as a user name, user address, user soft card accounts). The plug-in module matches the form fields with the user profile data types and fills in the forms with the appropriate user profile data types.

The plug-in module checks all of a merchant's requirements to enroll in a loyalty program. For example, a merchant can require that a user has conducted a certain number of transaction with that merchant before the user is allowed to enroll in the loyalty program. As another example, a merchant can require that a user have a certain minimum credit rating before he is allowed to enroll in a loyalty program. As another example, a merchant can require that a user supply his social security number. If the user's social security number is not stored in the user database, the user device can request the user to enter it. The plug-in module checks that all of these requirements are met before the user is enrolled in the loyalty program.

The merchant computer system can generate a list of unique membership numbers that can be assigned to new merchant loyalty accounts. These unique numbers are transmitted to merchant loyalty plug-in modules operating on server 60, a user device, or a merchant computer system.

The plug-in module then generates a new merchant loyalty membership account for the user including a unique membership number, a merchant icon, account set-up, and other soft card data. The plug-in module then transmits new merchant loyalty account data to the merchant issuer including the new account number, information identifying the user, and any other information requested by the merchant at step 1212/1232.

At step 1213/1222/1233, the merchant icon and the loyalty membership data including the member number is then transmitted to and stored on the user device. The user device can prompt the user to see if the user wants this data downloaded. Alternatively, the data is automatically downloaded to the user's device. If the plug-in operates on the user device, then the data is merely created and stored locally.

The merchant loyalty membership data can be securely stored in the user's device using encryption or other well known data security techniques. The FDA application can require that a user enter a PIN or password before the user can access the merchant loyalty soft card or any merchant loyalty benefits.

At step 1214/1223/1234, the user conducts a purchase transaction from the user device using the merchant loyalty program account. The user authorizes the FDA application on the user device to share the merchant loyalty soft-card data. The FDA application can share the soft card and other merchant loyalty data with a participating merchant to obtain the merchant loyalty benefits or any other authorized device. The soft-card data is concurrently maintained in a secure encrypted file on server 60 and on the user device.

Merchant loyalty plug-ins make it easy for users to sign-up for loyalty programs. Users merely have to indicate a desire to enroll in a merchant loyalty program and satisfy all of the merchant's requirements for the program. The rest of the process is transparent to the user.

A merchant loyalty plug-in module of the present invention can maintain users' merchant loyalty membership accounts. For example, a plug-in module can keep a record of a user's transactions that involve membership cards for a variety of purposes. For example, certain extra benefits can be provided to a user based on dollar amounts of merchandise purchased using a merchant loyalty card. A plug-in module can transmit updated data relating to the merchant loyalty accounts to merchants and users automatically or upon request.

A user can also download a merchant loyalty plug-in module to his PTD or PC. User merely selects a desired plug-in from a user interface (e.g., a web page) on the FDA application. The plug-in is then downloaded via a wireless ISP/Cellular network, the internet, or the Merchant systems network. The plug-in self-configures itself on the user's PTD and accesses the User's personal data. Cross-referencing between plug-in modules can also be effected to validate any cross-Merchant loyalty programs such as airline purchases and food discounts.

Figure 13:
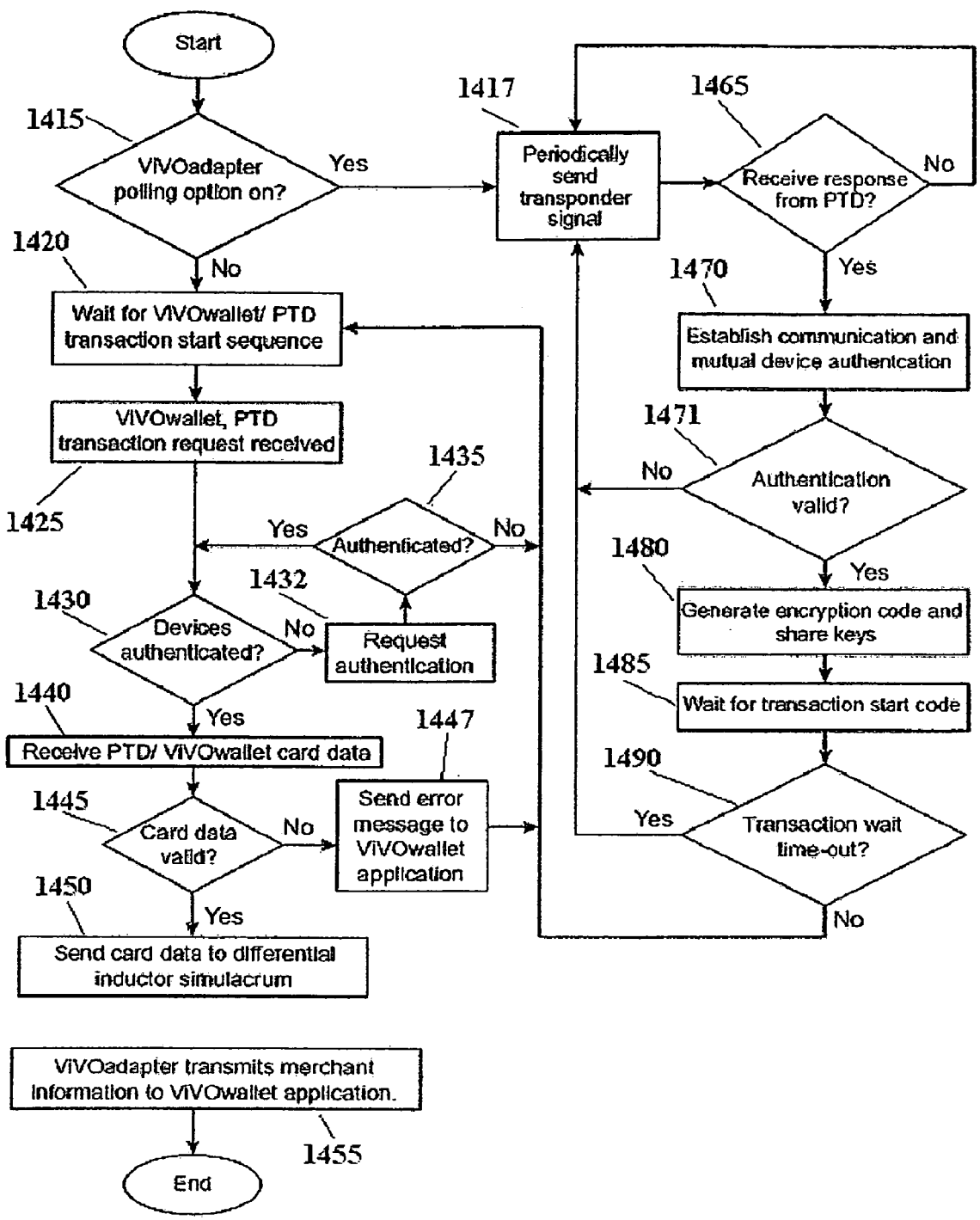
FIG. 13 is a flow chart that illustrates an interface process between a POS magnetic card acceptance system adapter and an FDA application according to an embodiment of the present invention.

FIG. 13 is a flow chart that illustrates the interface processes between adapter 35 and the FDA application. The process of FIG. 13 includes transparent transaction processes such as security and automatic polling of the Buyer's FDA application by the Merchant POS system.

If the polling feature of adapter 35 is ON (decisional step 1415), adapter 35 periodically transmits a transponder signal to a PTD at step 1417 and waits for a response. The transponder signal may conform to ISO 14443 Type A or Type B, IR type IrDa and ViVOtech Inc. proprietary and Consumer IR, Bluetooth, IEEE 802.11(b), and cellular/wireless ISP protocols.

If adapter 35 determines that a response is received at decisional step 1465, adapter 35 performs mutual device authentication and challenge protocols at step 1470. If the device authentication is validated at decisional step 1471, adapter 35 generates encryption codes and exchanges security routines, certificates, and/or keys with the PTD at step 1480, and then waits for the transaction start code at step 1485. If a response is not received before time-out, the adapter routine returns to step 1417.

If a response is received before time-out, adapter 35 waits for an FDA application start sequence at step 1420. When the start sequence is received from the PTD at step 1425, adapter 35 and the FDA application check to see if the devices are mutually authenticated within a specified period of time at step 1430.

If the devices are not mutually authenticated, adapter 35 requests re-authentication protocol procedures at step 1432 and may return to step 1420 or step 1430 if the devices are not authenticated.

Mutually authenticated devices initiate security encryption procedures and generate encryption codes and exchange cipher keys. Once mutual authentication protocols are confirmed, the FDA application transmits user-specific data to adapter 35 at step 1440. Adapter 35 confirms the card data is valid at step 1445, for example, via cyclic redundancy check (CRC), linear redundancy check (LRC), or similar method of data integrity verification. If adapter 35 is unable to confirm the validity of the card data within a specified number of attempts, an error message is transmitted to the FDA application at step 1447, and the transaction process is terminated.

If the card data is validated, adapter 35 transmits the digital data to inductor simulacrum 15 at step 1450 for inductive transfer to the POS magnetic card acceptance system device magnetic head component. Adapter 35 then transmits merchant-specific code information to the FDA application at step 1455. Adapter 35 can transmit a confirmation request. The transaction is then terminated.

A benefit of the process of FIG. 13 is that many steps of the process are transparent to the User. For example, an RF card can complete the process of FIG. 13 without any input from the Buyer, other than the Buyer submitting the card to adapter 35 for the required period of time. The Buyer can define or change the level of interaction that is required to complete the process. Adapter 35, the cellular wireless/ISP operator, or other network or device can determine if any password or other form of authentication is required.

Figure 14:
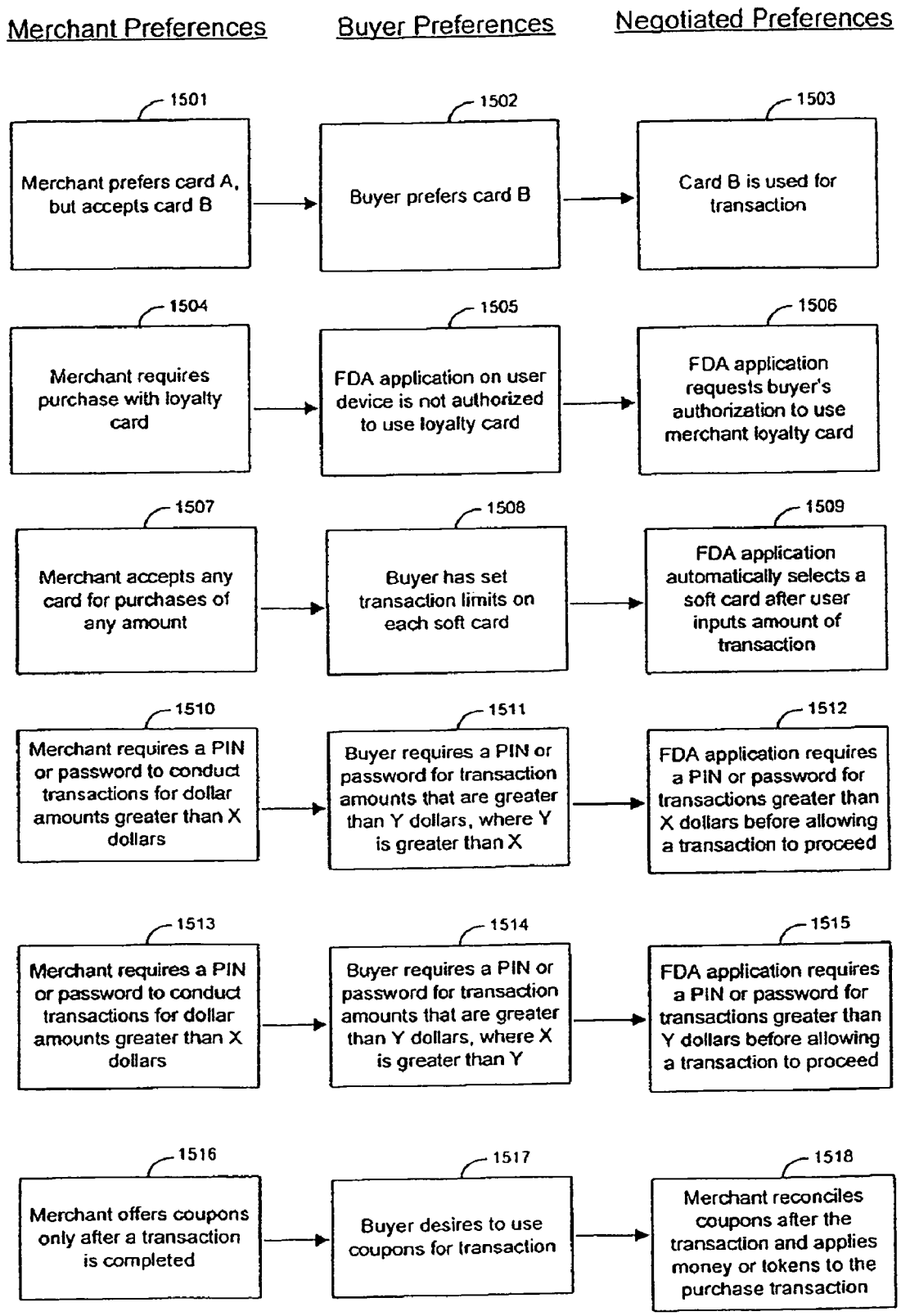
FIG. 14 illustrates merchant and buyer single-step collaborative soft-card negotiations according to embodiments of the present invention.

FIG. 14 is a diagram that illustrates examples of collaborative negotiation techniques that attempt to accommodate both a buyer's and a merchant's preferences according to embodiments of the present invention. A user of a user device is typically a buyer in the financial transactions described herein.

Buyers and merchants can set predefined preferences that are designed to regulate a financial transaction involving these parties. The preferences are predefined in the sense that they are defined by the user or merchant before the financial transaction is initiated. When a buyer and a merchant have preference settings that are different, collaborative negotiations are performed to accommodate each party's preferences so that a purchase transaction can be completed.

When a financial transaction is initiated, a user preference and a merchant preferences are accessed, and a negotiated preference is generated that accommodates both the user preference and the merchant preference. If the user preference and the merchant preference are not mutually exclusive, the negotiated preference attempts to satisfy both preferences. If the user preference and the merchant preference are mutually exclusive, the negotiated preference satisfies at least one of the two preferences based on which of the two preferences has a higher priority. The financial transaction is conducted based on the negotiated preference.

The negotiation process includes many different variations. In one embodiment, a merchant preference supercedes a buyer preference when the merchant preference has a higher priority. For example, a Merchant can require a Buyer to use a loyalty or member card to get a special discounted purchase price.

In other instances, a buyer preference supercedes a merchant preference when the buyer preference has a higher priority. For example, a buyer can require that a certain soft card be used with a transaction, regardless of a merchant's preferences. A buyer can also have preset spending limits for certain soft cards that a merchant cannot override.

The merchant computer system can query the buyer's user device regarding his purchase preferences. As an example, the query can cause the Buyer's FDA application to display the Merchant's loyalty or member card. As another example, the query can cause the FDA application to display a default card or some other card previously indicated by the user's preferences. As yet another example, the query from the Merchant system can cause the FDA to query the Buyer/user to select a purchase option or Soft-Card.

By collaboratively negotiating with the Buyer using an electronic transactional system of the present invention, a Merchant can reduce its risk by setting its own transaction limits for PINs and passwords and by indicating their preferred or accepted card(s) to the user's FDA application.

An additional advantage of the present invention is that a Buyer can purchase items and receive the benefit of loyalty and member programs without being interrogated by the POS service staff. Additionally, any loyalty awards, discounts, and coupons are submitted by the Merchant directly to the Buyer's FDA application for present or delayed consolidation and application, or to server 60 for post-transaction processing for benefit of the Buyer.

The first column in FIG. 14 illustrates examples of a merchant's preferences relating to collaborative purchase transactions. The second column in FIG. 14 illustrates examples a buyer's preferences relating to collaborative purchase transactions. The third column lists negotiated preferences that accommodate the buyer's and the merchant's preferences.

FIG. 14 illustrates several examples of buyer preferences and merchant preferences that can be set according to various embodiments of the present invention. A buyer and a merchant can set preferences that regulate transactions. For example, a buyer and a merchant can set preferences that indicate preferred soft-cards to be used in transactions.

Specifically, merchant preference 1501 indicates that the merchant prefers that a buyer use card A. However, the merchant accepts card B if the buyer cannot or will not use card A. The buyer's preference 1502 indicates that the buyer prefers card B. Because of the difference between the merchant and buyer preferences, the FDA application and the merchant system implement a negotiated preference. The negotiations process is preferably based on preset criteria and is transparent to the buyer. In the example negotiated preference 1503, card B is used to conduct the transaction, because merchant preference 1501 is set to accept card B.

As another example, a merchant preference 1504 requires that a buyer use a merchant's loyalty/member card to obtain certain discounts or loyalty program benefits. This requirement may be unknown to the Buyer. The Merchant's system sends a notification to the Buyer's user device identifying the loyalty card requirement. The FDA application receives the Merchant's notification and examines the buyer's corresponding preferences. The buyer's preference 1505 has not authorized the FDA application to use the merchant loyalty card. Because of the potential conflict between merchant and buyer preferences, the FDA application requests the buyer's authorization to use the merchant loyalty card according to negotiated preference 1506. If the buyer does not authorize use of the loyalty card, the buyer does not get the benefit of the merchant's discount or benefit.

This embodiment enables a buyer to obtain a merchant loyalty/member benefits in a transparent transaction process, and advises a buyer of a request to use a merchant's preferences. The buyer has control of the soft-card data proffered, and the Merchant has control of the minimum requirements for the transaction. This process reduces the merchant's transaction risk, as defined by the merchant, and benefits the buyer.

In another embodiment, the FDA application can automatically proffer a soft-card in response to a request from a merchant to use a specific card in a particular transaction. For example, an RF proximity card can know that Macy's prefers the Macy's card and can send the Macy's card upon interrogation, unless the buyer has preferences to the contrary.

As another example, a merchant sets a preference 1507 to use any card for purchases or transactions of any amount. A buyer has set preferences 1508 that define specific dollar amount limits for transactions conducted using each of the buyer's soft cards. The negotiated preference 1509 implements both the buyer and the merchant preferences by automatically selecting a soft card after the user inputs an amount of the transaction. The selected soft card has a user set transaction limit that is greater than or equal to the transaction amount. If none of the user's soft cards have a large enough transaction limit, the user is prompted to select a soft card and to waive its transaction limit. Otherwise, the transaction is terminated.

As another example, a merchant sets a preference 1510 to require a buyer to enter a pre-stored string such as a personal identification number (PIN) or a password to complete transactions for dollar amounts that are greater than X dollars. A buyer has set a preferences 1511 to require that the buyer enter a pre-stored string such as a PIN or a password to complete transactions for dollar amounts that are greater than Y dollars. In this example, Y dollars is greater than X dollars. According to the negotiated preference 1512, the FDA application requires that the buyer enter a pre-stored string for transactions that are greater than X dollars before allowing a transaction to proceed. Negotiated preference 1512 satisfies both the merchant and the buyer preferences 1510 and 1511.

As yet another example, a merchant sets a preference 1513 to require a buyer to enter a pre-stored string such as a personal identification number (PIN) or a password to complete transactions for dollar amounts that are greater than X dollars. A buyer has set a preference 1514 to require that a pre-stored string such as a PIN or a password be entered to complete transactions for dollar amounts that are greater than Y dollars. In this example, X dollars is greater than Y dollars. According to the negotiated preference 1515, the FDA application requires that the buyer enter the pre-stored string for transactions that are greater than Y dollars before allowing a transaction to proceed. Negotiated preference 1515 satisfies both the merchant and the buyer preferences 1513 and 1514.

As yet another example, a merchant sets a preference 1516 that indicates that the merchant offers certain coupons only after a transaction is completed. The buyer preference 1517 indicates that the buyer desires to use coupons for transactions. Preference 1517 can be specific to particular types of coupons, particular merchants, or particular types of transactions such as purchases of clothes. If the buyer's coupon preferences are compatible with the merchant's coupon, the coupons are reconciled after the transaction and funds are credited for the transaction according to negotiated preference 1518.

The Merchant can also have preferences that relate to other types of transaction level authorizations. The Merchant's preferences may also require personalized data such as a Merchant's name and POS system adapter serial numbers that are programmed and used for collaborative negotiations with the Buyer's preferences.

Figure 15:
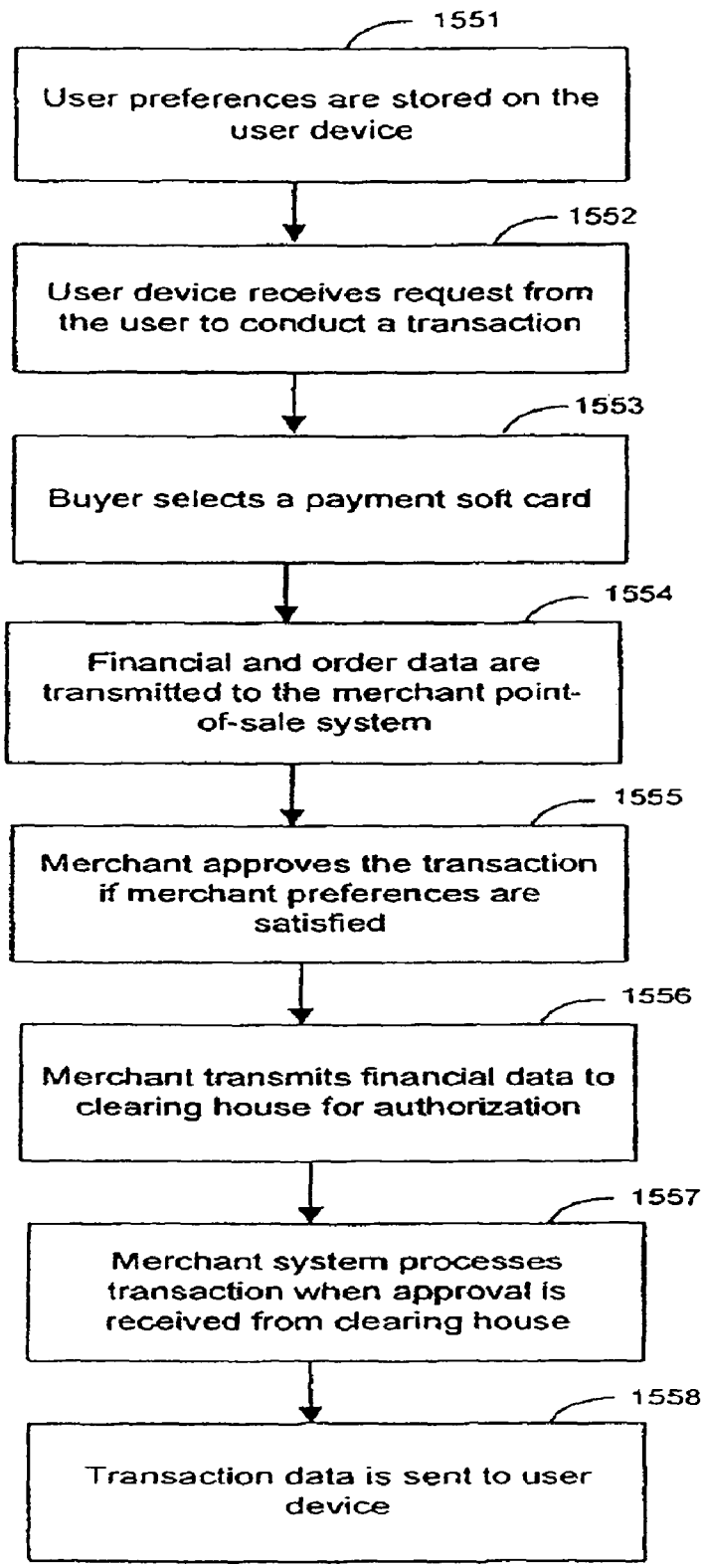
FIG. 15 illustrates single-step and negotiated purchase processes according to embodiments of the present invention.

FIG. 15 illustrates flow charts for typical FDA application purchase processes. The steps shown in FIG. 15 are merely examples of steps that can be used in these processes and are not intended to limit the scope of the present invention. Some of the steps shown in FIG. 15 can be omitted, and other steps not shown can be added.

The processes of FIG. 15 can be implemented as single-step or negotiated purchase processes. The negotiated merchant-buyer collaborative transactions shown in FIG. 14 are examples of negotiated purchase processes. In a single step transaction process, a buyer can purchase one or more items of merchandise (or services) with a single selection on the user device to complete the transaction.

In step 1551, the user's preferences are stored on the user device (e.g., PTD or PC). The user preferences can include the dollar limits for specific cards or types of transactions. The user device receives a request from the user (buyer) to conduct a transaction at step 1552. The user can initiate a transaction by selecting an option on the user device. A purchase authorization is then effected between the FDA application and the merchant point-of-sale system (which can include adapter 35).

At step 1553, the buyer selects a payment soft card. The buyer's financial soft card data and order data are sent to the merchant point-of-sale system at step 1554. The order can, for example, include an identification of an item or service that the user desires to purchase. If the transaction parameters satisfy the merchant's preferences, the merchant approves the transaction at step 1555.

The merchant then transmits the financial data to a clearing house for authorization to debit one of the user's account at step 1556. The clearing house can, for example, regulate user credit card accounts. The merchant POS system processes the transaction when authorization is received from the clearing house at step 1557. Transaction data is then sent to the user device at step 1558. This transaction data can include a confirmation code for the transaction, which can be used to redeem coupons or other items at a later time.

Figure 18:
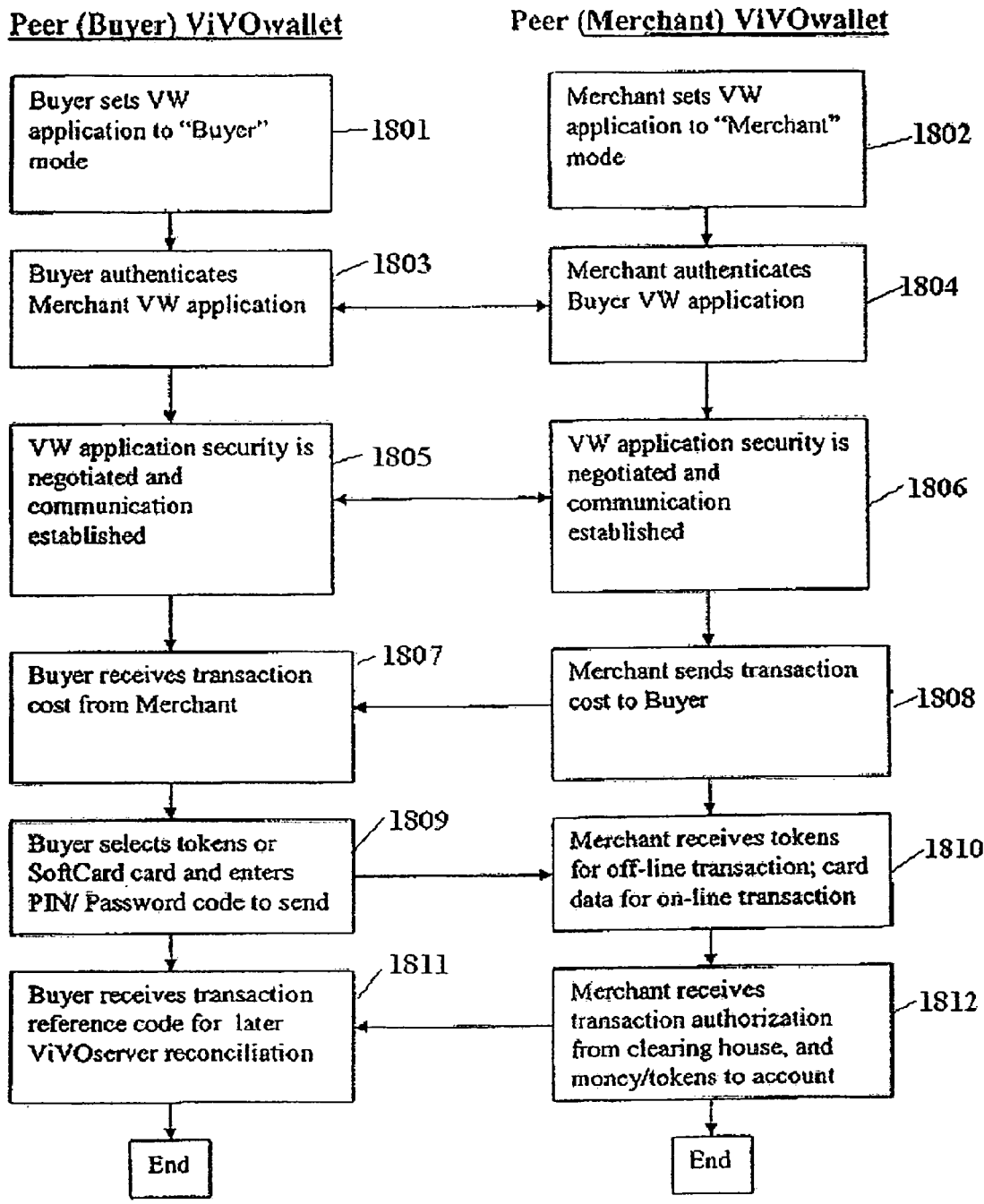
FIG. 18 illustrates a PTD peer-to-peer transaction process according to an embodiment of the present invention.

The techniques of the present invention utilize normal clearing house approval processes. The Merchant can enter the amount of purchase into the POS system, and the Buyer can accept the transaction at the FDA application. Off-line transactions are also supported by the use of tokens. In this instance, the Buyer can purchase tokens from the server 60, or such entities as PayPal™, and they will be applied to the participating Merchant. Peer-to-Peer transactions, described in FIG. 18, are supported for mobile vendors using the FDA application in the Merchant mode.

An alternative embodiment of the present invention is a "Micropayment" process. In this embodiment, the Merchant establishes a collections and payment account with the cellular/wireless ISP operator. The Merchant configures its POS adapter or FDA application operating in Merchant Mode with the relevant cellular/wireless ISP Merchant assignment data.

The normal purchase process described herein is executed. If the User and Merchant collaborative negotiations result in approval of a Micropayment process that meets any pre-defined credit/debit/prepaid limits, the financial transaction is applied to the cellular/wireless ISP operator. Debt for the transaction is assign to the Buyer's cellular/wireless ISP account for the benefit of the Merchant's cellular/wireless ISP account. The Buyer will makes payment upon periodic billing by the cellular/wireless ISP. The maximum cumulative Micropayment amount is determined by the cellular/wireless ISP credit agencies. Additionally, prepaid coupons or tokens can be used with Pay-Pal, server 60, or similar third party transaction processors.

Figure 16:
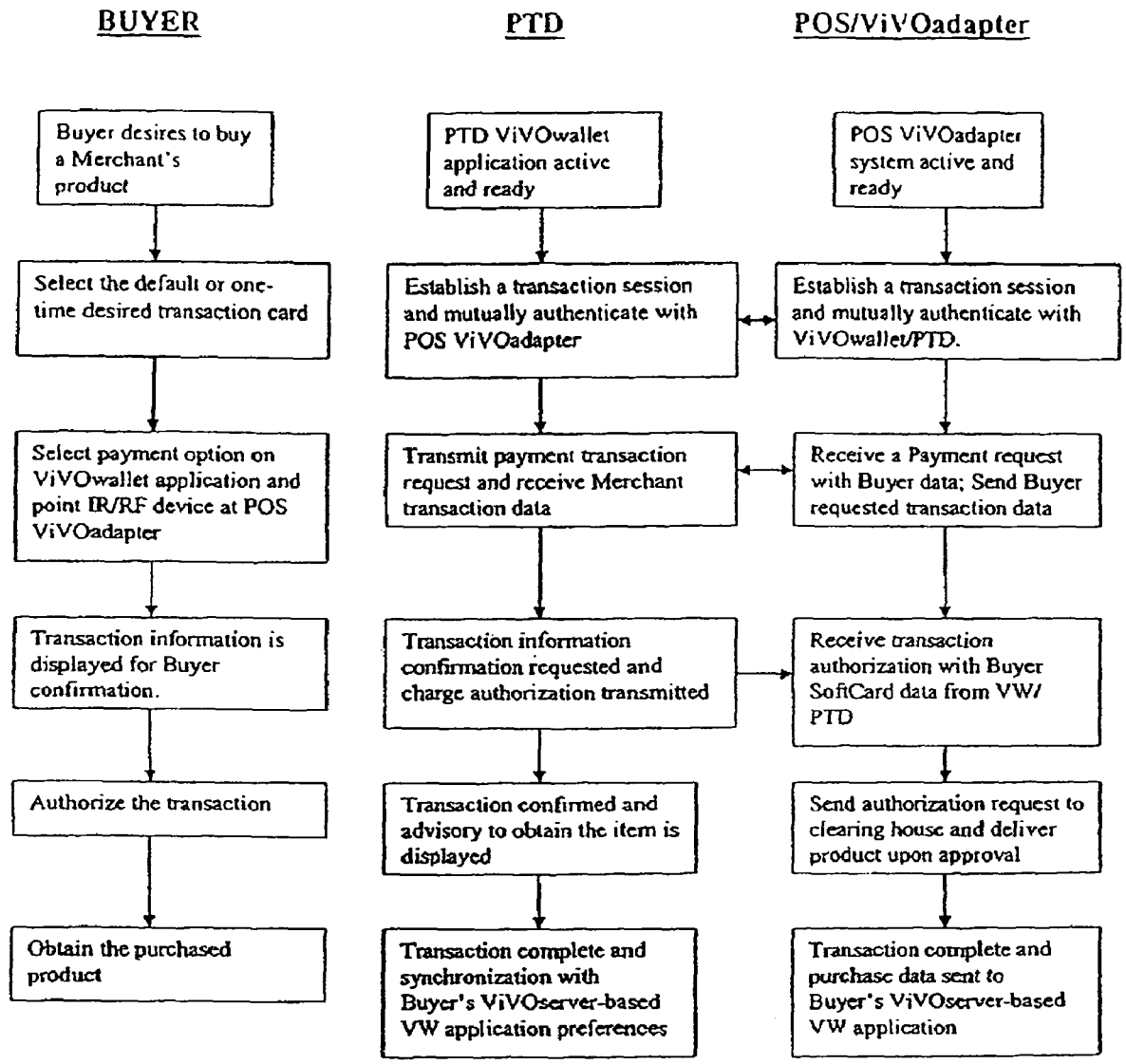
FIG. 16 illustrates FDA application purchase processes at an attended POS system according to an embodiment of the present invention.

FIG. 16 is a flow chart that illustrates examples of FDA application purchase processes at attended point of sale (POS) adapters. FIG. 16 illustrates steps in three columns. The first column identifies actions associated with the Buyer. The second column identifies actions performed by the PTD. The third column identifies actions performed by the Merchant's adapter 35.

The PTD and adapter 35 mutually authenticate and establish a transaction session. This session may, for example, include IR Object Exchange and IrDA and IrFM protocols exchange upon meeting the proximity requirements for the specific PTD radio frequency or infrared signals. IrDA stands for Infrared Device Association, which is a standards agency for a specific type of IR based communications, popular with communications devices. IrFM stands for Infrared Financial Messaging, a protocol for financial transactions established by the IrDA. A payment request is transmitted by adapter 35, and Merchant data is transmitted to the Buyer.

The Buyer's FDA application transmits the payment transaction request to the Merchant's adapter. A transaction code is generated by the PTD FDA application and adapter 35 upon confirmation by the transaction authorization center, or clearing house. The product or service is then provided to the Buyer. The transaction is reconciled and settlement actions completed by server 60, with notification to the FDA application, and posted on the User's server-based FDA application.

Alternatively, two distinct FDA applications may be configured in Merchant and Buyer modes. In this instance, the Buyer or Merchant initiates the transaction request. Processes similar to the ones shown in the figures are performed to establish mutual authentication, secure data communications, and transaction event logging.

In the on-line mode, the Merchant's adapter authenticates and authorizes the transaction via server 60. Transaction data is then transmitted to the Merchant and the Buyer. In off-line transactions, tokens issued by server 60 can be used. Reconciliation of the tokens to the Merchant can be effected in near real-time.

The benefit of the use of tokens is that transactions can be effected in areas not covered by cellular/wireless ISP signals such as in cars, in buildings, or outside of metropolitan areas. Such users will include taxi drivers, circus agents, door-to-door salesmen, street vendors, and any mobile Merchant with an established collections account with the server 60, PayPal, cellular/wireless ISP, or other third party service.

An alternate embodiment of the present invention is the ability of the FDA application and Merchant POS adapter to generate dynamic CVCC security codes for new magnetic Track #2-like Soft-Card data. The CVCC code is typically written on the back of existing magnetic stripe cards and is used for card-not-present authentication and on-line internet purchases. Card-not-present purchases are done at distance where the card is not scanned through a magnetic card acceptance system.

A benefit of the use of dynamic CVCC Track #2 code generation is the security of single-purchase authorizations whereby the code is be used a finite period of times, typically once, and changed. The dynamic generation/assignment of this CVCC code will reduce fraud, identity theft, and other unauthorized usage of Soft-Card data and reduce losses to the credit/debit/ATM/loyalty/prepaid/member card industry.

Another embodiment of the present invention is the application of the "Micropayment" process. One possible example of this embodiment is now described. According to this example, the Merchant establishes an account with the cellular/wireless ISP operator. The Merchant configures the POS adapter or the FDA application operating in Merchant Mode with cellular/wireless ISP Merchant assignment data. A standard purchase process is executed with a user from a PTD or PC.

If the User and Merchant collaborative negotiations result in approval of a Micropayment process, a cellular/wireless ISP operator applies credits and debits related to a financial transaction to the appropriate parties using accounting and reconciliation-on-behalf-of-others processes. Debt for the transaction is assigned to the Buyer's account for the benefit of the Merchant's account. The Buyer then makes payment, for example, upon periodic billing. The payments funds are transferred or paid to the Merchant's account and benefit. The maximum cumulative Micropayment amount can be determined by the cellular/wireless ISP credit agencies.

Figure 17:
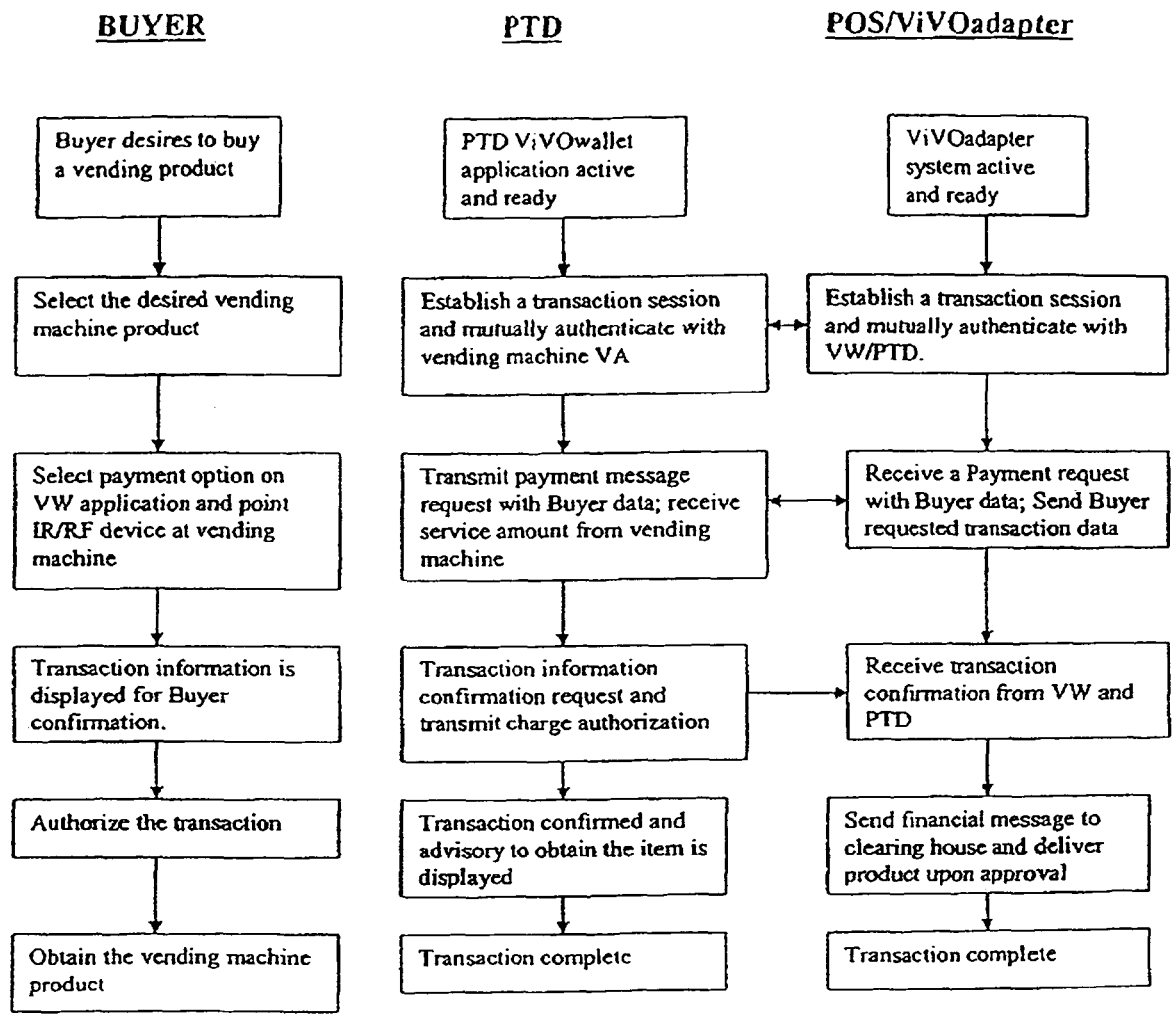
FIG. 17 illustrates an FDA application purchase process at an unattended POS system according to an embodiment of the present invention.

FIG. 17 is a flow chart that illustrates examples of FDA application purchase processes at unattended point of sale (POS) adapters. Unattended adapters can be found, for example, in vending machines and gasoline dispensing machines. FIG. 17 illustrates six sets of steps in three columns. The first column identifies actions associated with the Buyer. The second column identifies actions performed by the PTD. The third column identifies actions performed by the Merchant's unattended adapter 35.

According to the first set of steps in FIG. 17, the Buyer decides to purchase a product, the Buyer's PTD has the FDA application resident and operating, and the Merchant's adapter is installed and operating. In the second set of steps, the PTD and adapter mutually authenticate and establish a transaction session when within range. This session can include IR Object Exchange and IR Device Association and IR Financial Messaging protocols exchanged and described herein upon meeting the proximity requirements for the specific PTD.

In the third set of steps in FIG. 17, a payment request is transmitted by the adapter 35, and Merchant data is transmitted to the Buyer. The Buyer's FDA application transmits the payment transaction request to the Merchant's adapter. A transaction code will be generated by the FDA application and adapter 35 upon confirmation by the transaction authorization centers, or clearing house, in the fourth set of steps. The product or service is provided to the Buyer in the fifth set of steps. The transaction is reconciled and settlement actions completed by server 60 with notification to the FDA application, and posted on the User's server-based FDA application in the sixth set of steps.

Alternatively, two distinct FDA applications may be configured as Merchant and Buyer modes in a peer-to-peer transaction, as discussed above. In this embodiment, the Merchant as well as the Buyer conducts the transaction through a PTD.

Examples of unattended Merchant POS adapters 35 include vending machines, gas pumps, student cafeteria services, and other machines. The machines will have internet, local area, or cellular/wireless ISP network connections for on-line transaction authorization and clearing house approvals. The Merchant POS adapter-enabled machines can also accept payment tokens, prepaid tokens, gift certificates, loyalty program tokens, and Micropayments.

Tokens allow transactions to be effected in areas not covered by cellular/wireless ISP signals such as in cars, in buildings, or outside of metropolitan areas. Token users can include taxi drivers, circus agents, door-to-door salesmen, street vendors, and any mobile Merchant.

FIG. 18 is a flow chart that illustrates an embodiment of a Peer-to-Peer transaction process between FDA applications. The process of FIG. 18 enables two distinct FDA applications to establish a Merchant-Buyer configuration for transferring data as with many of the embodiments discussed above. According to this embodiment, two distinct FDA applications can conduct financial or token transactions, transfer Soft-Card data, transfer gift certificates, conduct inter-device synchronization upon User authorization, and transfer FDA software applications. One FDA application on a first user device can also transfer a merchant loyalty plug-in module to a second FDA application on a second user device in a peer-to-peer transaction.

The two FDA applications are set in Buyer and Merchant mode (steps 1801 and 1802) and are mutually authenticated (steps 1803 and 1804). A security session is established (steps 1805-1806), and the Merchant transmits a transaction cost to the Buyer (step 1808). The Buyer receives the transaction cost (step 1807) and selects a mutually agreeable transaction medium (steps 1809) such as tokens, a Soft-Card, a loyalty card, a micropayment, a gift certificate, or a member card. The Buyer then transmits this medium data after entering a PIN/password. The Merchant receives the payment (step 1810) and processes the payment according to the general methods described above. The Buyer receives a transaction reference code that can be used for reconciliation of the transaction with server 60 (step 1811). The Merchant receives a transaction authorization from a clearing house and receives money or tokens in its account at step 1812.

Transaction data is synchronized with server 60. Reconciliation and settlement occurs within normal card issuer billing periods. After the Buyer or the Merchant initiates the transaction request, processes occur to establish mutual authentication, secure data communications, and transaction event logging as discussed above.

Figure 19:
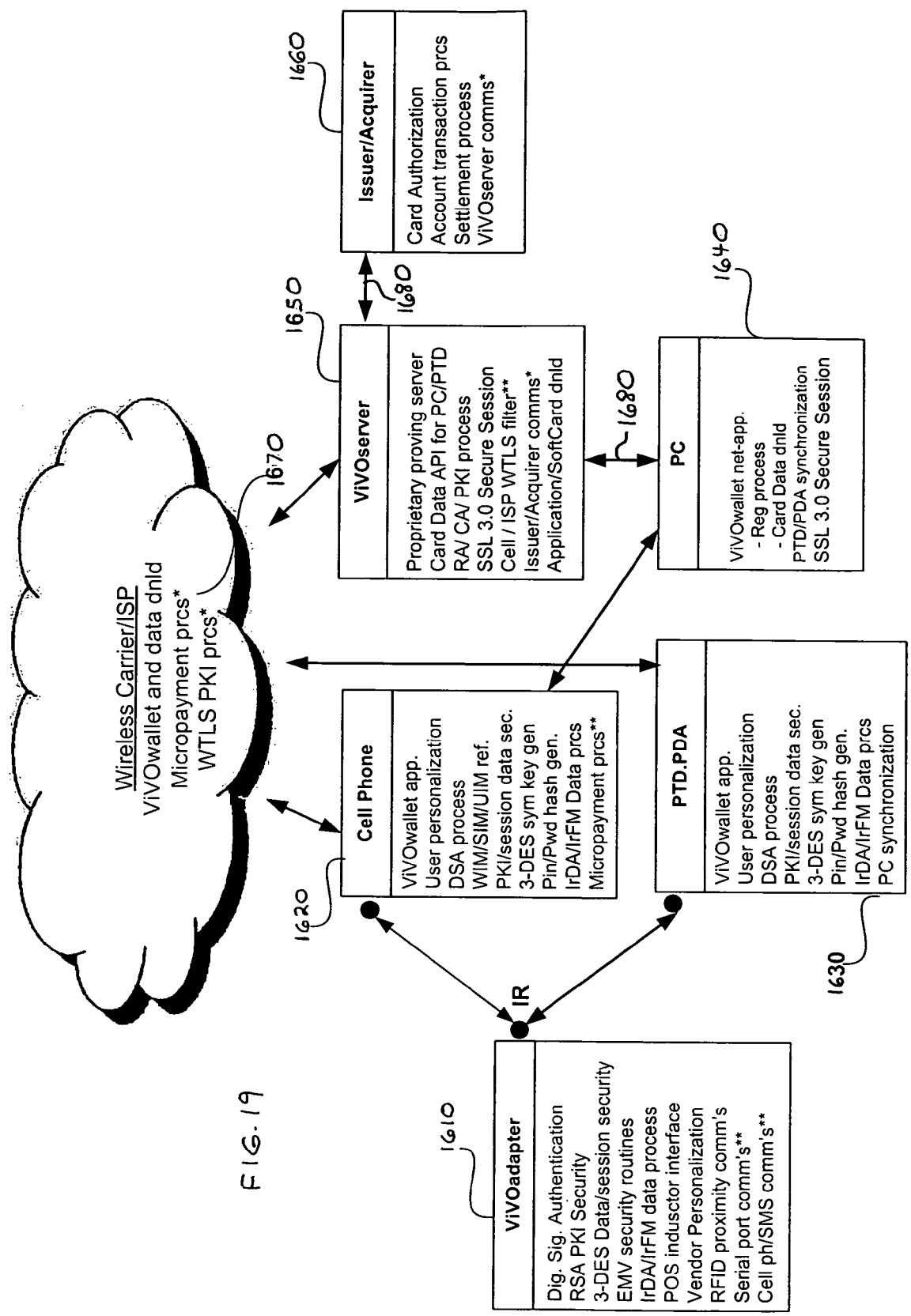
FIG. 19 illustrates a functional level diagram of several embodying features of the present invention.
Figure 20:
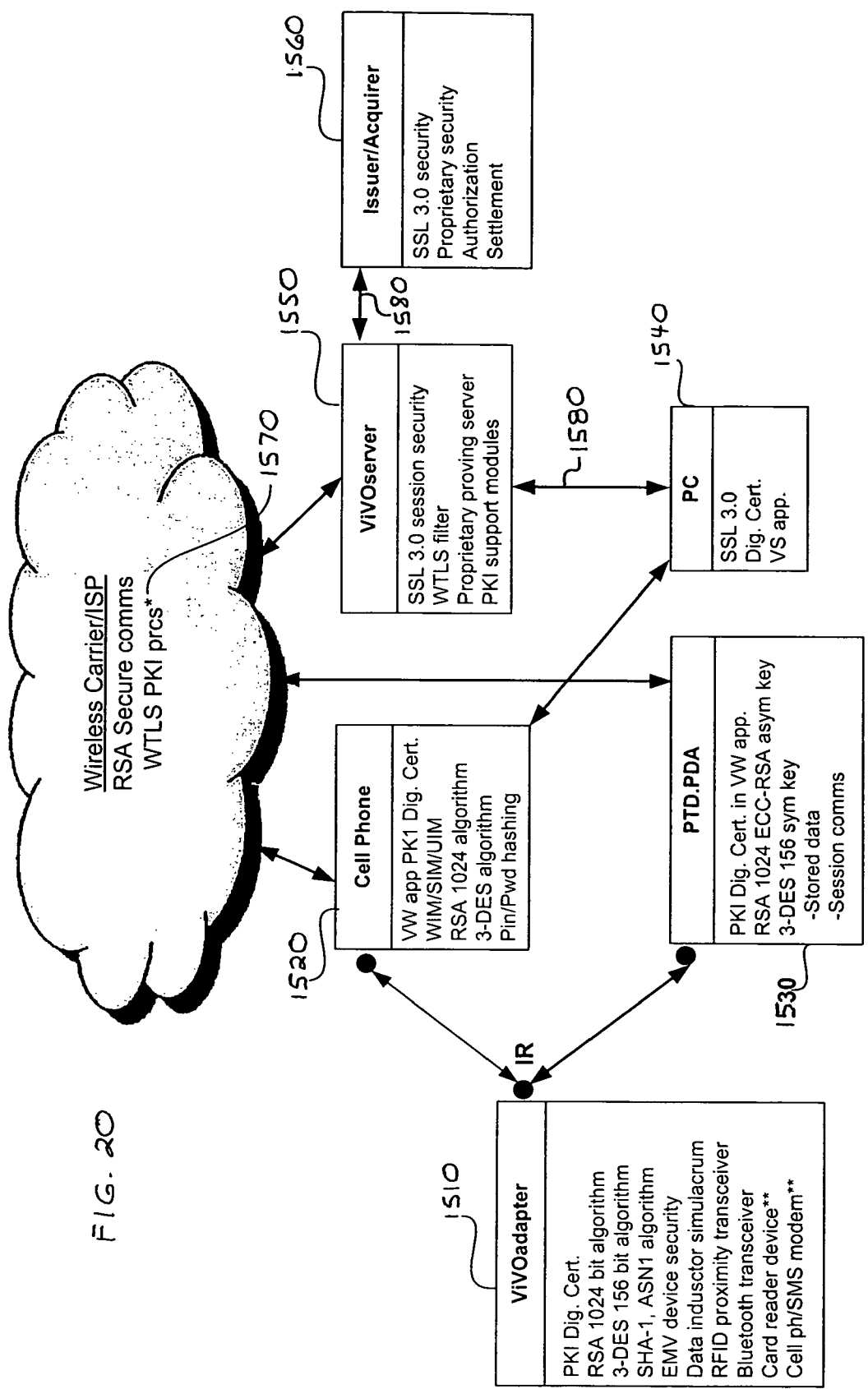
FIG. 20 illustrates a component level diagram of several embodying features of the present invention.

FIG. 19 is a functional diagram and FIG. 20 is a component diagram. FIGS. 19 and 20 illustrate the physical devices and systems that can be utilized to implement embodiments of the present invention. These devices and systems integrates a PTD, such as PDA 30 or cell phone 40, with the wireless carrier/ISP data communications network 66, the internet-based server 60, the internet-based user's PC 99, the Merchant's adapter 35, and a card issuer acquirer 92. In addition, server 60 may have an applications program interface (API) hook into the wireless carrier/ISP, enabling wireless network communications with server 60. Additionally, the integration of a cellular communications device into adapter 35 enables remote communications with the PTD, PC, internet, transaction authorization centers, and the cellular wireless/ISP carrier for such actions as transaction processing, authorization, reconciliation, settlement, event logging, and other actions described herein.

Adapter 35 can communicate with an RF card via inductive coupled RF transceiver. Adapter 35 can communicate with cell phone 40 and PTD/PDA 30 via IR, Bluetooth, IEEE 802.11(b), SMS or the wireless carrier/ISP network 66. PTD/PDA 30 can communicate via direct cable with the user's PC 99 or through cellular/wireless ISP provider 66. PC 99 can communicate with the PTD/PDA/cellular phone via a manufacturers cradle. PC 99 can communicate with server 60 via the internet. Server 60 can communicate with the Issuer/Acquirer 92 via the internet to obtain financial data and Merchant loyalty and member program Soft-Card data. PC based FDA application can communicate with adapter 35 via the internet and the wireless carrier/ISP network 66.

A benefit of this functional design is the integration of, IR, and RF transceiver equipment such as Bluetooth or IEEE 802.11(b) and cellular/wireless ISP networks into a single device that is permanently installed in the legacy magnetic stripe card acceptance systems.

Another benefit of the transaction processes of the present invention is the ability of the user to effect a "card-present" financial transaction via near-proximity infrared or by wireless carrier/ISP networks and without presentation of the actual magnetic card. This is a low risk transaction that is effected via security and authentication protocols and procedures. A "card-present" transaction will result in lower risk assignment by the card issuers and resultant lower transaction fees, Merchant qualification, and Merchant risk.

Another benefit of the transaction processes of the present invention is the capability of an adapter 35 to temporarily store/cache the magnetic card data introduced to the POS magnetic card acceptance system and then transmit this data to the user's PTD via infrared medium, or via RF proximity card protocols. Mutual authentication between card data and the user's PTD is required to ensure only magnetic card data assigned by the issuer to the user is captured and transmitted to the use's PTD via normal secure communications methods. Alternatively, the captured magnetic card data is transmitted via wireless carrier/ISP, SMS, and internet, or by normal surface and air mailing methods.

The transaction processes of the present invention are also advantageous, because these processes allow the user's cards to be aggregated and stored on a PTD and/or a PC. This aggregation provides users with greater convenience and greater security. The greater security is achieved through card data encryption measures and by not transporting the physical cards.

Many other configurations of adapter 35 and its associated equipment are within the scope of the present invention. For example, a PTD device with wireless network capabilities, an integrated infrared communications device, or other communications system can be used to communicate with an adapter 35. In addition, a Buyer's mobile PC system 99 can have an FDA application with the features discussed above that communicates with an adapter 35 to conduct transactions. PC 99 can communicate with adapter 35 and server 60 via the internet and wireless carrier/ISP.

According to a further embodiment of the present invention, adapter 35 is coupled to a user's PC for on-line purchases with a card. In this embodiment, the user first presents the card to adapter 35. Secure data is then transferred to the PC-based FDA application for secure transmission to the internet-based purchaser.

According to further embodiments of the present invention, other PTD-based FDA software applications can communicate with adapter 35.

According to still further embodiments of the present invention, the FDA application can be remotely located on the wireless carrier/ISP server 66 and/or server 60. In this embodiment, the FDA application can be remotely controlled by the Buyer's cell phone. Passive and active devices can also communicate with the FDA application. For example, car and home alarms can communicate via IR or RF with code strings stored within an FDA application.

Coalition Card

One specific application for which embodiments in accordance with the present invention are particularly suited, is in use of "coalition" cards at point of sale devices. Briefly, a "coalition" card is a smart card storing multiple types of account numbers for the same user.

For example, a first type of number stored on a coalition card may designate an general credit or debit account, as typically associated with a magnetic stripe card issued by AMERICAN EXPRESS, VISA, DISCOVER, and MASTERCARD. A financial transaction involving such a general use credit/debit account is "open-loop", in that it utilizes a global, large-scale infrastructure administered by a credit card company such as referenced above.

A second type of number stored on a coalition card may be for an account specific to other than a financial institution, for example a particular merchant or a coalition of merchants. Coalition cards may be used to conduct financial transactions with a member of a coalition directly, without an intervening open loop credit card processing or ATM network. A financial transaction involving an account of the second type is "closed-loop", in that it utilizes a localized, smaller scale infrastructure administered by the sponsoring entity such as the merchant coalition.

A coalition card may thus be characterized as a PTD in the form of an RF proximity chip card, which stores data of a plurality of Soft-Cards in the form of the at least the two different account types. These two different account types may be pre-loaded onto the coalition card prior to issuance to a cardholder.

Figure 21:
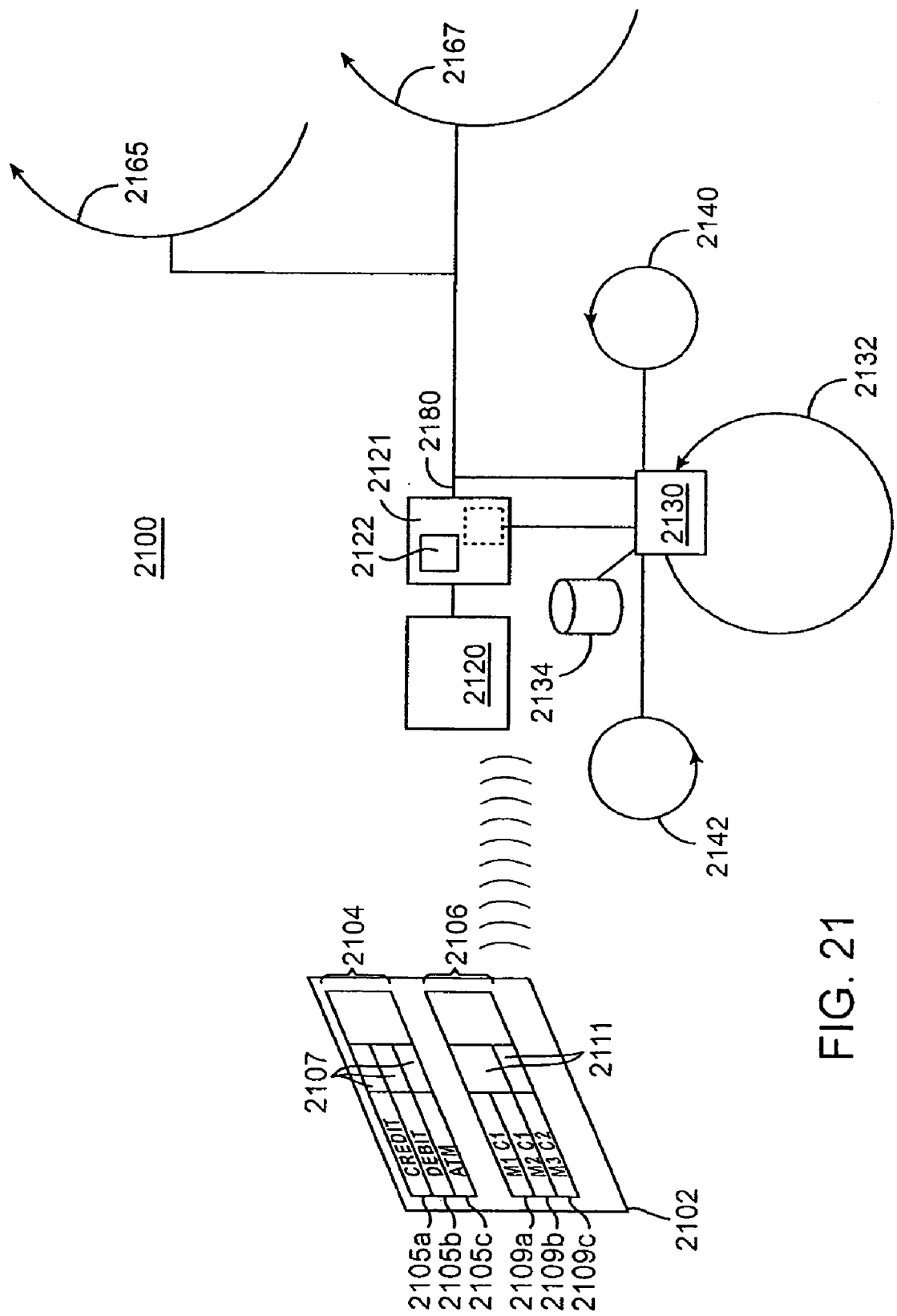
FIG. 21 is a simplified schematic diagram of an embodiment of a system in accordance with the present invention, allowing use of a coalition-type card.

Accordingly, embodiments of the present invention may be employed to allow a merchant to recognize and use coalition cards, without having to implement a costly new infrastructure. FIG. 21 shows a simplified schematic diagram of an embodiment of a system 2100 for such a coalition card-specific application in accordance with the present invention.

RF proximity chip card 2102 includes two different preloaded data types 2104 and 2106. First data type 2104 comprises information for a plurality of general financial accounts 2105*a-c*, corresponding respectively with conventional magnetic stripe credit, debit, and ATM cards. Data type 2104 includes specific codes 2107 which may designate the data type and the type of particular account that is represented.

RF proximity chip card 2102 also includes second data type 2106 comprising information for a plurality of accounts other than those listed above. For example, second data type 2106 may include information for a plurality of accounts 2109*a-c* relating to members of merchant coalition(s). Data type 2106 includes specific codes 2111 flagging the coalition and the member of the coalition.

FIG. 21 also shows a point-of-sale device including a contactless RF proximity chip card reader 2120. In the specific embodiment shown in FIG. 21, card reader 2120 is in electronic communication at the point of sale with a module 2121 including processor 2122. In alternative embodiments, the processor may be housed directly in the reader. Processor 2122 is configured to receive data from card 2102, and to recognize data types 2104 and 2106 present thereon.

Figure 22:
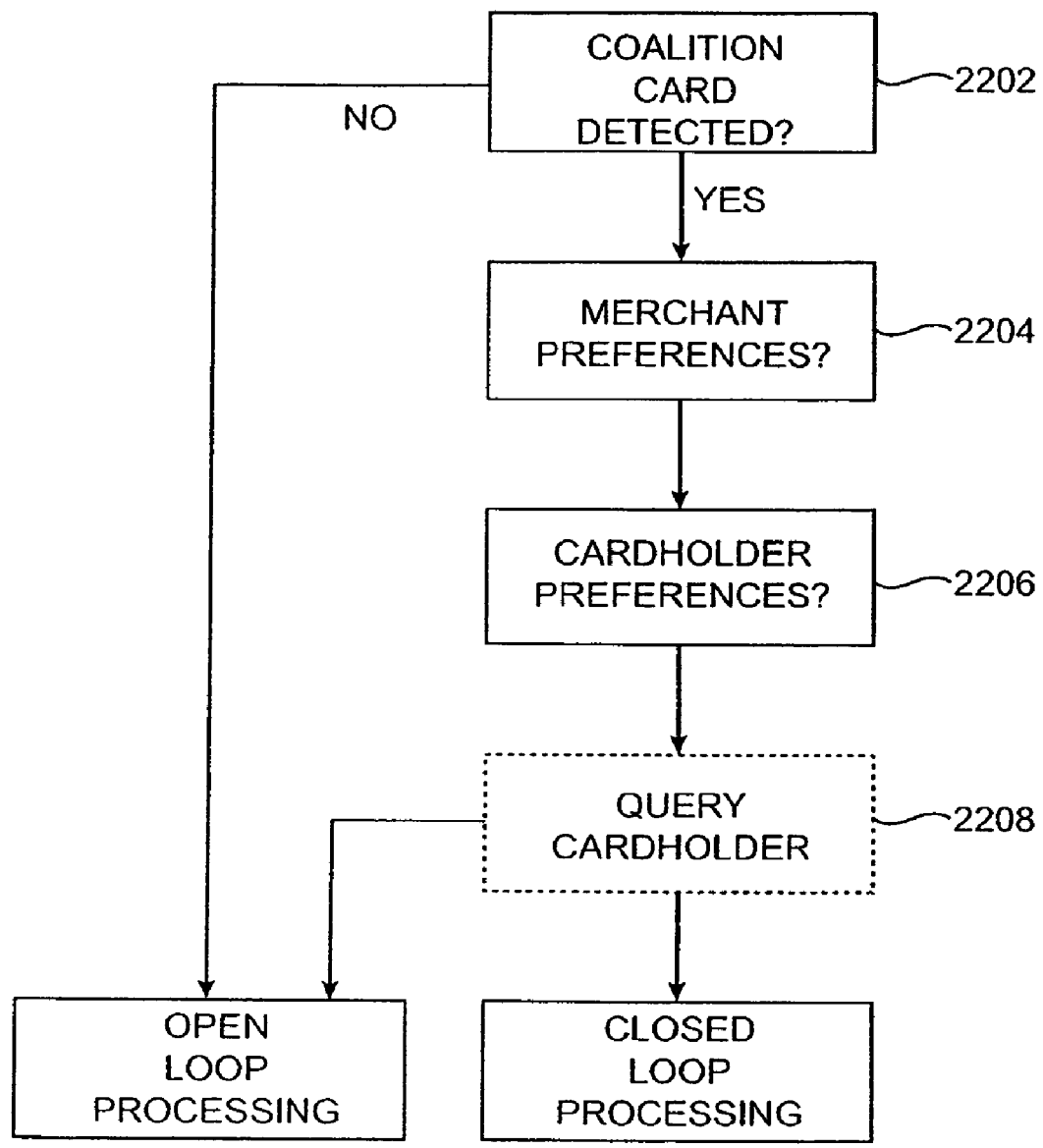
FIG. 22 is a simplified flow diagram of a method in accordance with an embodiment of the present invention showing steps of using a coalition-type card.

Based upon data types received and recognized from the coalition card, the processor is configured to negotiate a particular financial transaction with the card holder according to preferences, as described in detail above. For example, as shown in FIG. 22, when the coalition card 2102 is presented at a point of sale, the reader and the card can collaborate in a series of queries to determine the account to be used for that particular transaction and for that particular location. The processor may recognize and honor both a transaction type of the open-loop variety, and a transaction type of the closed-loop variety. Accordingly, the processor may be configured according to user preferences or merchant preferences, or a combination of both merchant preferences and user preferences, to automatically employ the closed-loop account data over the open-loop account data, querying the cardholder to manually override this default setting. Such a manual query is optional, however, and in accordance with other embodiments the transaction type could be decided by collaboration according to predefined preferences stored in the card and/or reader, without requiring manual action by the cardholder.

Based upon codes recognized from the card, and cardholder responses to queries posed by the reader, the processor can route the financial transaction information to the appropriate transaction processing system. Thus where data of the second type is not found, or where the cardholder accepts the reader's offer to manually select the conventional credit card account, the processor would be configured to route data from the card to one of the global, "open-loop" transaction processing networks 2165 and 2167 in the conventional manner.

Conversely, where the coalition data type is recognized from the card, and the cardholder declines the offer to manually select the conventional open-loop credit/debit/ATM account, the processor is configured to route data regarding the transaction to central server 2130. In accordance with one embodiment, the central server can be a direct part of the localized, closed-lop transaction processing infrastructure 2132. In this embodiment, the central server can thus process the transaction directly, matching up the data transmitted by the reader with a database 2134 correlating cardholder with a particular member of the coalition.

According to an even more useful embodiment, however, central server 2130 can be administered by a third party (such as ViVOtech), engaged by multiple coalitions to assist in implementing their specific closed-loop transaction processing infrastructures 2140 and 2142. Under this alternative embodiment, central server 2130 references codes transmitted from the reader with database 2134 to match up the transmitted data to a particular coalition infrastructure 2140 or 2142. Moreover, as the second data type may include a plurality of numbers designating different members of a coalition participating in the closed-loop transaction processing, processor 2122 and central server 2130 are also able to recognize transactions relating to particular members of a specific coalition for completion of the transaction.

The embodiment just described eliminates the need for each coalition to establish an entirely separate infrastructure for administering their program, allowing the third party to assume these duties. The third party can in turn reduce the costs associated with such program management, by contracting with a plurality of coalitions to perform this function.

The processor may employ different approaches to route transaction information along the appropriate pathway. In accordance with one embodiment, a switch 2160 may be controlled by the processor to route information to the central server. In this embodiment, detection of the second data type and the absence of a manual override by the user will result in the switch being configured to route information along the closed-loop pathway. In the absence of the specific conditions just enumerated, the processor may configure the switch to route the transaction along the open-loop pathway.

According to an alternative embodiment, no switch is used and the processor is configured to encode outgoing information transaction information with additional information permitting downstream recognition of the particular account type. For example, transaction data modified and forwarded by the reader to a common communication channel 2180 shared by the open- and closed-loop processing systems may include a code recognized only by the closed-loop system(s). The open-loop system(s) ignore the transaction data, which is recognized by the closed loop system(s) for processing.

FIG. 22 is a simplified flow diagram of a method in accordance with an embodiment of the present invention showing steps of using a coalition-type card. In a first step 2202 of method 2200, a POS reader device detects whether a coalition card is being offered by a user as a payment vehicle for a transaction.

If use of a coalition-type card is not detected in step 2202, the remainder of the transaction is routed to an open-loop infrastructure for execution. If use of a coalition-type card is detected in step 2202, in a second step 2204 the system checks to see if there is a merchant preference for conducting the transaction over a closed- or open-loop network. In a third step 2206, the system checks to see if there is a cardholder preference for conducting the transaction over a closed- or open-loop network. Based upon any detected merchant or cardholder preferences, the POS device routes the transaction to the appropriate open- or closed-loop network. In an optional step 2208, the POS device may manually query the cardholder to allow selection of one type of network over another for conducting the transaction, thereby allowing the cardholder to manually override any existing preferences.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiment disclosed, but that the invention will include all embodiments and equivalents falling within the scope of the claims.

What is claimed is:

1. A method for processing a commercial transaction, the method comprising:
    receiving at a card reader data from a mobile personal trusted device, said data including a first data type indicating an open-loop transaction account, and a second data type indicating a closed-loop transaction account;
    recognizing at the reader the first data type and the second data type;
    selecting at the reader between the open-loop transaction account and the closed-loop transaction account according to a predetermined merchant preference; and
    conducting the transaction at the reader according to the selected transaction account, wherein conducting the transaction comprises routing the selected data type to a closed-loop transaction processing system or an open-loop transaction processing system based on the selected transaction account.

2. The method of claim 1 wherein the personal trusted device comprises a cell phone.

3. The method of claim 1 wherein the personal trusted device comprises a personal digital assistant.

4. The method of claim 1 wherein the data is received utilizing an infrared communication protocol.

5. The method of claim 1 wherein the data is received utilizing spectrum sharing methods.

6. The method of claim 1 wherein the data is received utilizing a Radio Frequency (RF), Bluetooth, WiFi, cellular, or wireless ISP protocol.

7. The method of claim 1 wherein the selecting is performed according to a combination of the predetermined merchant preference and a predetermined cardholder preference.

8. The method of claim 1 wherein the selecting includes causing the reader to pose a query to the cardholder.

9. The method of claim 1 wherein the transaction is conducted by routing the selected data type to one of the closed-loop transaction processing system and the open-loop transaction processing system.

10. The method of claim 9 wherein the transaction is routed by operation of a switch.

11. The method of claim 1 wherein the transaction is conducted by routing the selected data type to both the closed-loop transaction processing system and the open-loop transaction processing system, the method further comprising causing the reader to add information to the data type allowing recognition by only the closed-loop transaction processing system.

12. The method of claim 1 wherein the second data type comprises information regarding a merchant coalition.

13. The method of claim 1 wherein the transaction is conducted by routing the second data type to a server in communication with a database storing information regarding members of a coalition.

14. The method of claim 13 wherein the server is administered by the coalition.

15. The method of claim 13 wherein the server is administered by a third party on behalf of the coalition.

16. A method comprising:
    causing a personal trusted device to transmit to a card reader, data including a first data type indicating an open-loop transaction account, and a second data type indicating a closed-loop transaction account, such that the reader selects between the open-loop transaction account and the closed-loop transaction account according to a predetermined merchant preference and conducts the transaction according to the selected transaction account, wherein conducting the transaction comprises routing the selected data type to a closed-loop transaction processing system or an open-loop transaction processing system based on the selected transaction account.

17. The method of claim 16 wherein the personal trusted device comprises a cell phone.

18. The method of claim 16 wherein the personal trusted device comprises a personal digital assistant.

19. The method of claim 16 wherein the data is transmitted utilizing an infrared communication protocol.

20. The method of claim 16 wherein the data is transmitted utilizing spectrum sharing methods.

21. The method of claim 16 wherein the data is transmitted utilizing a Radio Frequency (RF), Bluetooth, WiFi, cellular, or wireless ISP protocol.

22. The method of claim 16 further comprising the personal trusted device receiving a query from the reader in response to transmission of the data.

* * * * *